US011924634B2

(12) United States Patent
Arkko et al.

(10) Patent No.: US 11,924,634 B2
(45) Date of Patent: Mar. 5, 2024

(54) METHODS PROVIDING AUTHENTICATION USING A REQUEST COMMIT MESSAGE AND RELATED USER EQUIPMENT AND NETWORK NODES

(71) Applicant: Telefonaktiebolaget LM Ericsson (publ), Stockholm (SE)

(72) Inventors: Jari Arkko, Kauniainen (FI); Vesa Lehtovirta, Espoo (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 246 days.

(21) Appl. No.: 17/422,497

(22) PCT Filed: Jan. 13, 2020

(86) PCT No.: PCT/SE2020/050022
§ 371 (c)(1),
(2) Date: Jul. 13, 2021

(87) PCT Pub. No.: WO2020/153889
PCT Pub. Date: Jul. 30, 2020

(65) Prior Publication Data
US 2022/0286846 A1    Sep. 8, 2022

Related U.S. Application Data

(60) Provisional application No. 62/794,970, filed on Jan. 21, 2019.

(51) Int. Cl.
*H04L 29/06* (2006.01)
*H04L 9/32* (2006.01)
*H04W 12/06* (2021.01)

(52) U.S. Cl.
CPC .......... *H04W 12/06* (2013.01); *H04L 9/3271* (2013.01); *H04L 2209/80* (2013.01)

(58) Field of Classification Search
CPC .. H04W 12/06; H04L 9/3271; H04L 2209/80; H04L 63/0442; H04L 63/08; G06F 21/44
See application file for complete search history.

(56) References Cited

U.S. PATENT DOCUMENTS 7,694,335 B1    4/2010   Turner et al.
9,378,345 B2 *  6/2016   Zhang .................... G06F 21/33
(Continued)

FOREIGN PATENT DOCUMENTS

CN     101505479 B  *  4/2014
WO     WO-2006043446 A1 *  4/2006 ........... H04L 9/3273
WO     2016020012 A1   2/2016

OTHER PUBLICATIONS

International Search Report and Written Opinion dated Apr. 15, 2020 for International Application No. PCT/SE2020/050022 filed Jan. 13, 2020, consisting of 16-pages.
(Continued)

*Primary Examiner* — Shawnchoy Rahman
(74) *Attorney, Agent, or Firm* — Christopher & Weisberg, P.A.

(57) ABSTRACT

Methods of operating a user equipment (UE) in a mobile communication network are disclosed. An authentication process start message may be transmitted from the UE to the mobile communication network, wherein the authentication process start message includes an identifier for the UE. After transmitting the authentication process start message from the UE, a request commit message may be received from the mobile communication network. Responsive to receiving the request commit message, a response commit message may be transmitted to the mobile communication network. After transmitting the response commit message, an authentication challenge message may be received corresponding
(Continued)

to the authentication process start message. Related methods of operating network nodes are also discussed.

16 Claims, 19 Drawing Sheets

(56) References Cited

U.S. PATENT DOCUMENTS

| | | | |
|---|---|---|---|
| 9,998,287 B2* | 6/2018 | Lee | .................. H04L 9/3263 |
| 2002/0073322 A1 | 6/2002 | Park et al. | |
| 2012/0180119 A1 | 7/2012 | Bessis et al. | |
| 2016/0261414 A1* | 9/2016 | Lee | .................. H04L 9/3297 |

OTHER PUBLICATIONS

3GPP TR 33.819 V1.2.0; 3rd Generation Partnership Project; Technical Specification Group Services and System Aspects; Study on security for 5GS enhanced support of Vertical and LAN Services; (Release 16), Aug. 2019, consisting of 31-pages.
3GPP TS 33.501 V15.3.1; 3rd Generation Partnership Project; Technical Specification Group Services and System Aspects; Security architecture and procedures for 5G system (Release 15), Dec. 2018, consisting of 181-pages.
J. Arkko et al.; Improved Extensible Authentication Protocol Method for 3rd Generation Authentication and Key Agreement (EAP-AKA') draft-ietf-emu-rfc5448bis-04; Network Working Group Internet-Draft, IETF Trust, Jan. 17, 2019, consisting of 45-pages.
J. Arkko et al.; Improved Extensible Authentication Protocol Method for 3rd Generation Authentication and Key Agreement (EAP-AKA'); Network Working Group Request for Comments: 5448; IETF Trust, May 2009, consisting of 29-pages.
J. Arkko et al.; Perfect- Forward Secrecy for the Extensible Authentication Protocol Method for Authentication and Key Agreement (EAP-AKA' PFS) draft-arkko-eap-aka-pfs-04; Network Working Group Internet-Draft, IETF Trust, Jan. 21, 2019, consisting of 25-pages.
B. Aboba et al.; Extensible Authentication Protocol (EAP); Network Working Group Request for Comments: 3748, The Internet Society, Jun. 2004, consisting of 67-pages.
3GPP TSG SA WG3 (Security) Meeting #89 S3-173229 revision of S3-17xabc; Title: SIDF location clarification in subclause 6.1.2; Agenda Item: 7.2.14; Source: LG Electronics; Document for: Approval; Date and Location: Nov. 27-Dec. 1, 2017, Reno (US), consisting of 3-pages.
3GPP TS 23.501 V15.4.0; 3rd Generation Partnership Project; Technical Specification Group Services and System Aspects; System Architecture for the 5G System; Stage 2 (Release 15), Dec. 2018, consisting of 236-pages.
3GPP TS 23.003 V15.6.0; 3rd Generation Partnership Project; Technical Specification Group Core Network and Terminals; Numbering, addressing and identification (Release 15), Dec. 2018, consisting of 130-pages.
Extended European Search Report dated Aug. 19, 2022 for Application No. 20744267.4, consisting of 8 pages.
Pellikka et al. "Lightweight Host and User Authentication Protocol for All-IP Telecom Networks" IEEE Centre for Wireless Communications, University of Oulu; Finland, 2012, consisting of 7 pages.
Zlomislic et al. "Denial of service attacks, defences and research challenges"; Springer Science+Business Media, New York, Jan. 19, 2017, consisting of 11 pages.
3GPP TSG-CT WG1 Meeting #92 C1-151775; Title: IKEv2 liveness check; Source: Ericsson; Agenda Item; 13.13.3; Documnet for: Discussion and Agreement; Location and Date: Sanya (P.R. of China), May 25-29, 2015, consisting of 3 pages.

\* cited by examiner

METHODS PROVIDING AUTHENTICATION USING A REQUEST COMMIT MESSAGE AND RELATED USER EQUIPMENT AND NETWORK NODES

CROSS-REFERENCE TO RELATED APPLICATIONS

This application is a Submission Under 35 U.S.C. § 371 for U.S. National Stage Patent Application of International Application No.: PCT/SE2020/050022, filed Jan. 13, 2020 entitled "METHODS PROVIDING AUTHENTICATION USING A REQUEST COMMIT MESSAGE AND RELATED USER EQUIPMENT AND NETWORK NODES," which claims priority to U.S. Provisional Application No.: 62/794,970, filed Jan. 21, 2019, the entireties of both of which are incorporated herein by reference.

TECHNICAL FIELD

The present disclosure relates generally to communications, and more particularly, to wireless communications and related wireless communication devices and network nodes.

BACKGROUND

The 5G security model includes an extension to better support privacy of subscribers' identities.

All 3GPP mobile network systems have supported the concept of temporary identities (e.g., TMSI), but to date they have always had a mode where the network can force the UE to send its permanent identifier (IMSI). This mode has been used for situations where the network has no prior knowledge of the UE or the subscriber, or when the system has lost information about the TMSI that it had already agreed with the subscriber.

5G defines the SUbscription Permanent Identifier (SUPI) and SUbscription Concealed Identifier (SUCI) in references [4], [5], and [6] (identified below). SUPI is globally unique and allocated to each subscriber. However, it is only used internally in the 5G network, and is privacy sensitive. The SUCI is a privacy preserving identifier containing the concealed SUPI, using public key cryptography to encrypt the SUPI.

The SUCI is communicated by the UE to the network as part of the authentication procedure. The format of the SUCI is as specified in reference [6]. For instance, assuming the IMSI 234150999999999, where MCC=234, MNC=15 and MSISN=0999999999, the Routing Indicator 678, and a Home Network Public Key Identifier of 27. If we express the SUCI as a NAI and with the protection profile "A", the SUCI looks as follows:

type0.rid678.schid1.hnkey27.ecckey<ECC ephemeral public key>.
cip<encryption of 0999999999>.mac<MAC tag value>@nai.5gc.
mnc015.mcc234.3gppnetwork.org Here the encrypted part is something that uses public key encryption. The key pair used for this is the home network's public (encryption by the UE) and private key (decryption by the home network).

Both the encryption and decryption may require considerable computing effort, compared to looking at cleartext IMSIs from all previous 3GPP releases, or identities encrypted with a symmetric key.

However, encrypting the identities may be important to reduce/avoid privacy issues/problems. As a result, when authenticating to a 5G network, only the 5G SUCI identifier should be used. This is because the well-known "IMSI catcher" and "false base station attacks" utilized the opportunity for the network to request UEs to reveal their permanent identifier. A way to address this vulnerability may be a significant step forward in the overall security of the mobile networks.

In general, the authentication process in 5G may also be extended from past generations, by introducing the Extensible Authentication Protocol (EAP). EAP is a general-purpose authentication framework, capable of supporting AKA (Authentication and Key Agreement), certificate, and other authentication methods. In 5G, authentication can be performed either through the traditional, native AKA procedure or through EAP. Both may be used/required to be supported.

EAP is defined in reference [7], and its AKA authentication method is defined in references [1] and [2]. A benefit of EAP is its flexibility; new methods or extensions of older methods can be easily defined, and they affect only the endpoints (the UE and the authentication server in the home network), not any of the intermediate nodes.

For instance, Ericsson has defined one extension over the basic EAP-AKA' method, for the purpose of increasing security in case the SIM (Subscriber Identity Module) card long-term secrets are compromised in reference [3]. Notwithstanding know authentication methods, improved security may still be desired.

SUMMARY

According to some embodiments of inventive concepts, methods of operating a network node of a mobile communication network may be provided. An authentication process start message may be received from a user equipment (UE), wherein the authentication process start message includes an identifier for the UE. Responsive to receiving the authentication process start message from the UE, a request commit message may be transmitted to the UE. After transmitting the request commit message, a response commit message may be received from the UE. Whether to proceed with authentication of the UE may be determined based on the response commit message.

According to some embodiments of inventive concepts, a network node of a mobile communication network comprises a processor and memory coupled with the processor, wherein the memory includes instructions that when executed by the processor may cause the network node to receive an authentication process start message from a user equipment (UE), wherein the authentication process start message may include an identifier for the UE. Responsive to receiving the authentication process start message from the UE, a request commit message may be transmitted to the UE. After transmitting the request commit message, a response commit message may be received from the UE. Whether to proceed with authentication of the UE, may be determined based on the response commit message.

According to some embodiments of inventive concepts, a network node of a mobile communication network may be adapted to receive an authentication process start message from a user equipment (UE), wherein the authentication process start message may include an identifier for the UE. Responsive to receiving the authentication process start message, a request commit message may be transmitted to the UE. After transmitting the request commit message, a response commit message may be received from the UE.

Whether to proceed with authentication of the UE may be determined based on the response commit message.

According to some other embodiments of inventive concepts, methods of operating a user equipment (UE) in a mobile communication network may be provided. An authentication process start message may be transmitted from the UE to the mobile communication network, wherein the authentication process start message includes an identifier for the UE. After transmitting the authentication process start message from the UE, a request commit message may be received from the mobile communication network. Responsive to receiving the request commit message, a response commit message may be transmitted to the mobile communication network. After transmitting the response commit message, an authentication challenge message may be received corresponding to the authentication process start message.

According to some other embodiments of inventive concepts, a user equipment, UE, of a mobile communication network comprises a processor and memory coupled with the processor, wherein the memory includes instructions that when executed by the processor may cause the UE to transmit an authentication process start message to the mobile communication network, wherein the authentication process start message may include an identifier of the UE. After transmitting the authentication process start message, a request commit message may be received from the mobile communication network. Responsive to receiving the request commit message, a response commit message may be transmitted to the mobile communication. After transmitting the response commit message, an authentication challenge message may be received corresponding to the authentication process start message.

According to some other embodiments of inventive concepts, a user equipment, UE, of a mobile communication network may be adapted to transmit an authentication process start message to the mobile communication network, wherein the authentication process start message may include an identifier for the UE. After transmitting the authentication process start message, a request commit message may be received from the mobile communication network. Responsive to receiving the request commit message, a response commit message may be transmitted to the mobile communication network. After transmitting the response commit message, an authentication challenge message may be received corresponding to the authentication process start message.

By using a request commit message and a response commit message to determine whether to proceed with authentication according to some embodiments, improved security may be provided. Such security may be provided, for example, based on a risk for denial-of-service attack.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
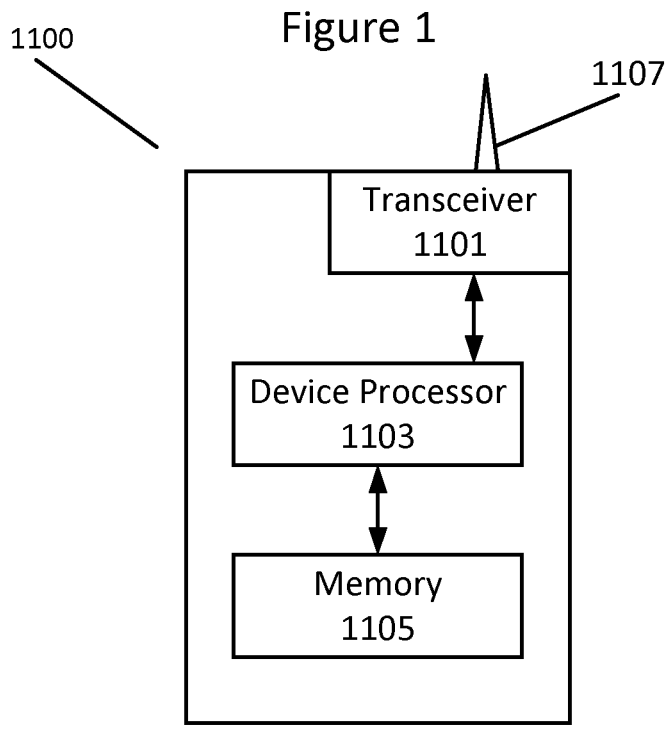
FIG. 1 is a block diagram illustrating a wireless device UE according to some embodiments of inventive concepts.

FIG. 1 is a block diagram illustrating elements of a user equipment UE 1100 (also referred to as a wireless communication device, a wireless terminal, a wireless communication terminal, wireless device, or a user equipment node/terminal/device) configured to provide wireless communication according to embodiments of inventive concepts. As shown, user equipment UE 1100 may include a transceiver circuit 1101 (also referred to as a transceiver) including a transmitter and a receiver configured to provide uplink and downlink radio communications with a base station of a radio access network. User equipment UE 1100 may also include a processor circuit 1103 (also referred to as a processor) coupled to the transceiver circuit, and a memory circuit 1105 (also referred to as memory) coupled to the processor circuit. The memory circuit 1105 may include computer readable program code that when executed by the processor circuit 1103 causes the processor circuit to perform operations according to embodiments disclosed herein. According to other embodiments, processor circuit 1103 may be defined to include memory so that a separate memory circuit is not required. User equipment UE may also include an interface (such as a user interface) coupled with processor 1103, and/or wireless communication device UE may be incorporated in a vehicle.

As discussed herein, operations of user equipment UE 1100 may be performed by processor 1103 and/or transceiver 1101. For example, processor 1103 may control transceiver 1101 to transmit communications through transceiver 1101 over a radio interface uplink to a radio access network (RAN) base station (e.g., an eNodeB/eNB or gNodeB/gNB) and/or to receive communications through transceiver 1101 from a radio access network base station (e.g., an eNodeB/eNB or gNodeB/gNB) over a radio interface downlink. Such communications may be transmitted/received to/from one or more core network nodes of the communication network through a RAN base station. Moreover, modules may be stored in memory 1105, and these modules may provide instructions so that when instructions of a module are executed by processor 1103, processor 1103 performs respective operations (e.g., operations discussed below with respect to Example Embodiments 39-56).

Figure 2:
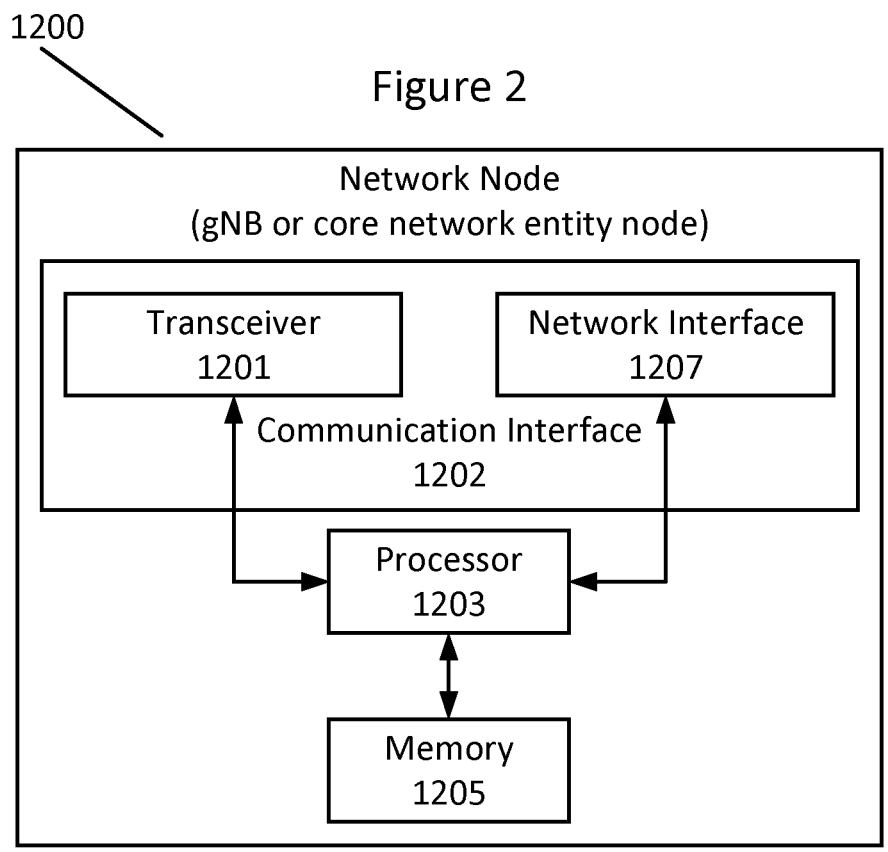
FIG. 2 is a block diagram illustrating a network node according to some embodiments of inventive concepts.

FIG. 2 is a block diagram illustrating elements of a node 1200 (also referred to as a network node, base station, eNB, eNodeB, gNB, gNodeB, core network entity node etc.) of a mobile communication network (also referred to as a wireless communication network) configured to provide cellular communication according to embodiments of inventive concepts. As shown, the network node 1200 may include communication interface with a transceiver circuit 1201 and/or a network interface circuit 1207. A radio access network RAN base station node, for example, and include transceiver circuit 1201 for wireless communication with wireless devices and network interface circuit 1207 for communication with other base stations and/or with core network entity nodes. A core network entity node may omit the transceiver circuit, and communications between such a core network entity node and a wireless device may be provide through the network interface circuit and a base station. Transceiver circuit 1201 (also referred to as a transceiver) may include a transmitter and a receiver configured to provide uplink and downlink radio communications with wireless communication devices UEs. The network node may include a network interface circuit 1207 (also referred to as a network interface) configured to provide communications with other nodes (e.g., with other base stations and/or core network entity nodes) of the RAN and/or core network. The network node may also include a processor circuit 1203 (also referred to as a processor) coupled to the communication interface, and a memory circuit 1205 (also referred to as memory) coupled to the processor circuit. The memory circuit 1205 may include computer readable program code that when executed by the processor circuit 1203 causes the processor circuit to perform operations according to embodiments disclosed herein. According to other embodiments, processor circuit 1203 may be defined to include memory so that a separate memory circuit is not required.

As discussed herein, operations of the network node may be performed by processor 1203, network interface 1207, and/or transceiver 1201. For example, processor 1203 may control transceiver 1201 to transmit communications through transceiver 1201 over a radio interface to one or more wireless devices UEs and/or to receive communications through transceiver 1201 from one or more wireless devices UEs over a radio interface. Similarly, processor 1203 may control network interface 1207 to transmit communications through network interface 1207 to one or more other network nodes and/or to receive communications through network interface from one or more other network nodes. According to some embodiments of inventive concepts, a core network entity/node (e.g., an authentication server function AUSF node) may be provided using the structure of FIG. 2 (without transceiver 1201). Moreover, modules may be stored in memory 1205, and these modules may provide instructions so that when instructions of a module are executed by processor 1203, processor 1203 performs respective operations (e.g., operations discussed below with respect to Example Embodiments 1-34).

The 3GPP WG SA3 has a study item titled "Enhance the security of the authentication procedure". Among other things, this study item is expected the look at the problem of denial-of-service that is caused by the SUCI process:

Asymmetric algorithms have been introduced in 5G to protect the Subscription Permanent Identifier (SUPI). This provides the possibility for adversaries to launch DDoS attacks on UDM.

In summary, the authentication procedure should be enhanced to defend against the following attacks:

. . .

(3) DDoS Attacks and

In 5G, asymmetric algorithm ECIES has been introduced to protect the Subscription Permanent Identifier (SUPI). The computation cost of an asymmetric algorithm is usually about 100 times heavier than that of a symmetric algorithm. This provides the possibility for adversaries to launch DDoS attacks on UDM. Only after decrypting SUCI, UDM can ascertain the validation of the Nausf_UEAuthentication_Authenticate Request message. Thus, it may be possible for adversaries to fake a large amount of messages containing SUCI from the whole world to target an intended UDM. This could make the attacked UDM crash due to the overloading CPU.

5 Suggestion

SA3 is kindly asked to create a study item to enhance the security of the authentication procedure to defend against the identified attacks, including . . . and DDoS attacks.

An issue with the SUCI encryption is that it may be trivial to produce an encrypted-looking identity string, and request authentication, whereas the decryption and verification of the validity of the identity string may take significantly more time.

More specifically, three issues with current 5G design are discussed below.

First, there may be limited opportunity for the network to ensure that the UE requesting authentication is an actual device. It has sent a radio message, and there's a radio-level handshake process, but once that is complete, the request for authentication is a single message. The home network may not get to perform any kind of further handshakes to ensure that the device is listening for messages and around for longer than the short duration radio handshake.

Second, if there's an ongoing denial-of-service attack, there may be no opportunity to request the UE to perform work to prove that it is committed to the authentication process.

Third, if there's an ongoing denial-of-service attack, there may be limited opportunity for a previously-authenticated UE to employ any previous association between the UE and the home network to prioritize the re-authentication of the UE over other (perhaps attacking) UEs. Only the EAP-AKA'-level re-authentication process can be performed, but that may require both the network to hold state for that particular UE.

According to some embodiments of inventive concepts, a process may be provided where the home network can request/perform, if an ongoing load at the home network indicates a possible denial-of-service situation, one of the following. An additional exchange (also referred to as a liveness check) with the UE may be performed to ensure that it is still reachable and willing to authenticate. A solution to a cryptographic puzzle may be requested from the UE before proceeding; and/or An authentication priority token may be submitted to a UE during a previous authentication, and then use of that token may be required for expedited processing during the possible denial-of-service attack, without having to look up a particular UE when processing that token. These additional exchangers and cryptographic puzzles may be used for denial-of-service defense, and some embodiments of inventive concepts herein may apply these techniques in the 5G context, with specific signaling and authentication mechanisms. Authentication tokens may also be used, and authentication tokens may be used as priority tokens may in a denial-of-service situation according to some embodiments of inventive concepts.

According to some embodiments of inventive concepts, defense may be provided against denial-of-service attacks related to the 5G new identities. For example, 5G authentication may be protected from denial-of-service attacks on the concealed 5G identifier encryption mechanism.

Some embodiments of inventive concepts are discussed in greater detail below. According to some embodiments, an authentication node (also referred to as an Authentication Server Function node, an AUSF node, an Authentication Server Function, an AUSF, an authentication server/node, etc.) may monitoring for Denial-of-Service attacks. More particularly, the home network may first implement a mechanism whereby it can monitor its authentication request load. If that load exceeds a predefined limit, for example, it can enter a so-called denial-of-service defense mode. The home network may also set the defense mode on for specific visited networks or UEs, either based on some risk assessment or a random process to provide that the defense mechanisms do not reveal the denial-of-service status of the network.

Secondly, the home network can run its authentication process and AKA and EAP-AKA' protocols based on whether the defense mode is on or not. If the defense mode is not on, the home network (e.g., authentication server) may proceed as currently defined in the specifications. If the defense mode is on, the home network (e.g., authentication server) may implement an extra procedure as defined below (separately for AKA and EAP-AKA').

According to some embodiments the EAP-AKA' extra procedure may be performed as discussed below with respect to Operations 101 to 108.

Operation 101. As in every EAP-AKA' process, the authentication server has received the authentication process start message over the signaling means between the visited and home networks, and the SUCI is carried in that message.

Operation 102. If the defense mode is not on, the authentication server would continue from sending the first message of the EAP-AKA' process, which is EAP-Request/AKA'-Challenge in most cases; the process continues then as specified in references [1] and [2]. But if the defense mode is on, instead, send a new message, the EAP-Request/AKA'-Commit message instead. This message is a request for the UE to: respond (show liveness); optionally, a command to solve a cryptographic puzzle; optionally, a command to use a previously acquired authentication priority token to move forward in the authentication process; and/or optionally, a command to either solve a cryptographic puzzle or use an authentication priority token.

Operation 103. The UE receives the EAP-Request/AKA'-Commit message and determines what it needs to do. If asked, it will check whether it has a previously stored authentication priority token. If asked, it will solve a cryptographic puzzle. If asked, it will do both or choose. When allowed to choose, the UE will choose the authentication priority token if it has one.

Operation 104. In any case, the UE will respond to the request by sending an EAP-Response/AKA'-Commit message. This message carries the puzzle solution or authentication priority token, if available.

Operation 105. The authentication server will inspect the response, if any. If there was no response, the authentication server will retransmit the request. If the process times out, no more action is needed.

Operation 106. If there is a response, the authentication server will inspect the response. If the response includes a puzzle solution, the server checks that the solution is correct, and proceeds to Operation 108. If the solution is not correct, the authentication server can either stop the authentication process or retransmit by continuing again from Operation 102.

Operation 107. If the response is an authentication token, the server checks the token and, if correct, proceeds to Operation 108. Otherwise, the authentication server can either stop the authentication process or retransmit by continuing again from Operation 102.

Operation 108. The authentication server can proceed forward with the rest of the authentication process as defined in reference [1] and [2], e.g., by sending the EAP-Request/AKA'-Challenge message.

A native AKA Extra Defense Procedure is discussed below. Some embodiments of an AKA extra procedure may be provided as discussed below with respect to Operations 201 to 210.

Operation 201. As in every AKA process, the authentication server has received the authentication process start message over the signaling means between the visited and home networks, and the SUCI is carried in that message.

Operation 202. If the defense mode is not on, the authentication server would continue from sending the first message of the AKA process, which is sending an AKA Challenge. The process continues then as specified in reference [5]. But if the defense mode is on, instead, send a new message between the authentication server and the visited network. This message is a request for the UE to: respond (show liveness); optionally, a command to solve a cryptographic puzzle; optionally, a command to use a previously acquired authentication priority token to move forward in the authentication process; and/or optionally, a command to either solve a cryptographic puzzle or use an authentication priority token.

Operation 203. The visited network receives the AKA Commit message. It sends a new message between the visited network and the UE, again the AKA Commit message.

Operation 204. The UE receives the AKA Commit message and determines what it needs to do. If asked, it will check whether it has a previously stored authentication priority token. If asked, it will solve a cryptographic puzzle. If asked, it will do both or choose. When allowed to choose the UE will choose the authentication priority token if it has one.

Operation 205. In any case, the UE will respond to the request by sending an AKA Commit message. This message carries the puzzle solution or authentication priority token, if available.

Operation 206. The visited network receives the message and relays it back to the home network authentication server.

Operation 207. The authentication server will inspect the response, if any. If there was no response, the authentication server will retransmit the request. If the process times out, no more action is needed.

Operation 208. If there is a response, the authentication server will inspect the response.

If the response includes a puzzle solution, the server checks that the solution is correct, and proceeds to Operation 208. If the solution is not correct, the authentication server can either stop the authentication process or retransmit by continuing again from Operation 202.

Operation 209. If the response is an authentication token, the server checks the token and, if correct, proceeds to Operation 208. Otherwise, the authentication server can either stop the authentication process or retransmit by continuing again from Operation 202.

Operation 210. The authentication server can proceed forward with the rest of the authentication process as defined in reference [5], i.e., by sending the AKA Challenge message.

The authentication token can be constructed in multiple ways. According to some embodiments of inventive concepts, the following construct may be used.

The authentication server may hold a periodically changing, randomly generated secret Sauth. For each period of time, i, there is a different $Sauth_i$. The server also holds a database of token identifiers tid. These identifiers can be generated sequentially or be randomly chosen.

On each EAP-AKA' authentication run, the server delivers an authentication priority token to the UE. It does this by adding an AT_ENCR_DATA attribute to the EAP-Request/AKA'-Challenge message. The encryption of AT_ENCR_DATA is as specified in references [1] and [2]. This attribute will carry, encrypted, a new attribute AT_AUTHPRIO_TOKEN to carry a token which is calculated as follows:

token=$i$|tid|mac, where, mac=$f$(Sauth,$i$|tid).

The token is thus determined as a concatenation of i, tid, and mac, and mac is a determined using a cryptographic function (f) using "Sauth" as a key and using i|tid (a concatenation of i and tid) as message data.

That is, the server constructs tokens which carry an indicator of the period they were from, a token identifier, and a mac (message authentication code) that is a cryptographic authentication code (MAC or HMAC) calculated over the message "i|tid" (time period i concatenated with token identifier tid), using the secret $Sauth_i$ that only the server can know. The token is delivered confidentially to UEs, and upon seeing a token returned from a UE to the server, the server can check whether the token is valid: i corresponds to a period that the server knows and which is recent enough, i.e., the server remembers $Sauth_i$; the mac is correctly calculated; and/or the tid is unused.

Upon seeing and accepting a token, the given tid is marked as used, and can no longer be used.

Note that the tokens are not bound to a specific identity. They could be, of course, but in order to check that the identity matches the stated identity (SUCI) in the new authentication run, the given SUCI would have to be decrypted. So any help that the tokens provide for denial-of-service protection needs to happen before this decryption. In theory, a number of UEs could collaborate by loaning tokens from each other for a denial-of-service attempt. But this is somewhat impractical, and even if this was done, the number of tokens is still limited. Whereas today, the number of authentication attempts one can do may not be limited at all.

Operations/messages of user equipment UE 1100 and network node 1200 will now be discussed with reference to the diagram of FIG. 3 according to some embodiments of inventive concepts. For example, the UE of FIG. 3 may be provided using the structure of FIG. 1, and the network node AUSF of FIG. 3 may be provided using the structure of FIG. 2. For the UE of FIG. 3, modules may be stored in memory 1105 of FIG. 1, and these modules may provide instructions so that when the instructions of a module are executed by processor 1103, processor 1103 performs respective UE operations of FIG. 3. For the network AUSF node of FIG. 3, modules may be stored in memory 1205 of FIG. 2, and these modules may provide instructions so that when the instructions of a module are executed by processor 1203, processor 1203 performs respective network node operations of FIG. 3.

Figure 3:
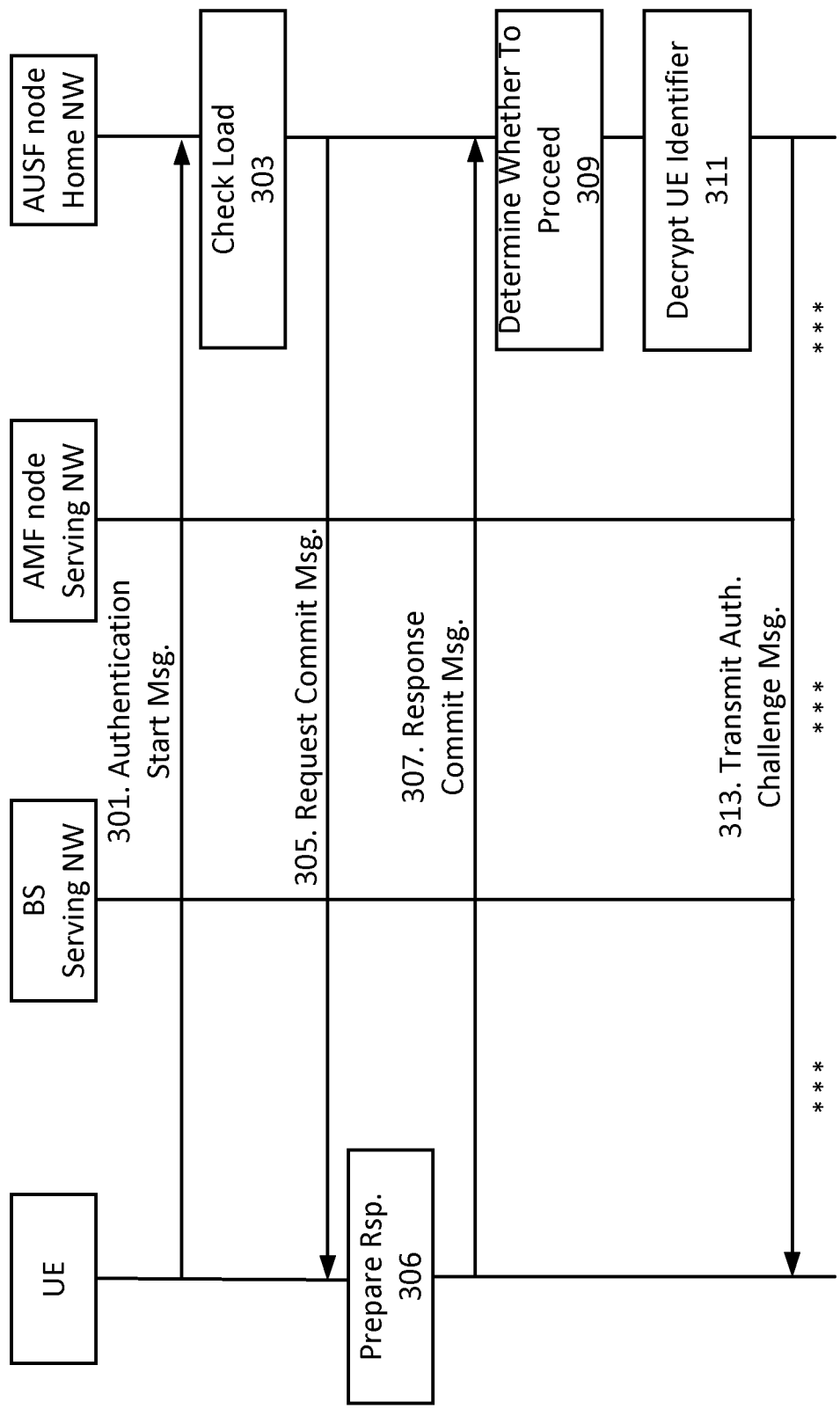
FIG. 3 is a message diagram illustrating messages/operations according to some embodiments of inventive concepts.

Various operations/messages from the diagram of FIG. 3 may be optional with respect to some embodiments of UEs and/or network nodes. Regarding methods of example embodiment 1 (set forth below), for example, operations/messages 303, 306, 311, and 313 of FIG. 3 may be optional. Regarding methods of example embodiment 39 (set forth below), for example, operations/messages 303, 306, 309, and 311 of FIG. 3 may be optional.

At 301, UE processor 1103 may transmit authentication process start message through transceiver 1101, through a serving network base station, and through a serving network AMF node to a home network AUSF node, and the home network AUSF node processor 1203 may receive the authentication process start message through network interface 1207. Moreover, the authentication process start message may include an identifier for the UE, and the authentication process start message may be provided according to an EAP-AKA' protocol. In addition, the identifier for the UE may be a SUbscription Concealed Identifier (SUCI) for the UE containing a concealed SUbscription Permanent Identifier (SUPI) for the UE.

At block 303, processor 1203 of the AUSF node may access a load of authentication process start messages and/or a risk assessment based on a risk for denial-of-service attack. At block 303, AUSF node processor 1203 may determine whether to proceed with normal authentication (decoding the auth. Process start message and sending an authentication challenge message, e.g., EAP-Request/AKA'-Challenge) or to require additional steps before decoding.

Responsive to a load of authentication process start messages and/or a risk exceeding a threshold, for example, AUSF processor 1203 may transmit a request commit message through network interface 1207 to the UE at 305. As shown, the request commit message may be transmitted through the serving network AMF node and the serving network base station to the UE, and UE processor 1203 may receive the request commit message through transceiver 1101.

At block 306, UE processor 1103 may determine an appropriate response to the request commit message, and at 307, UE processor 1103 may transmit a response commit message through transceiver 1101, through serving network base station, and through serving network AMF node to home network AUSF node. Home network AUSF node processor 1203 may receive the response commit message through network interface 1207, and at block 307, home network AUSF node processor 1203 may determine whether to proceed with authentication of the UE based on the response commit message.

According to some embodiments, the request commit message 305 may be a liveness check request, and the response commit message 307 may be a liveness check response. In such embodiments, processor 1203 may determine at 309 to proceed with authentication of the UE based on receiving the liveness check response of 307. In the alternative, processor 1203 may determine to not proceed with authentication of the UE if a liveness check response is not received (i.e., a liveness check response commit message 307 is not received).

According to some embodiments, the request commit message 305 may include a request to solve a cryptographic puzzle, and the response commit message 307 may include a solution to the cryptographic puzzle. At block 306 in such embodiment, UE processor 1103 may determine the solution to the cryptographic puzzle that is included in response commit message 307. At block 309, AUSF processor 1203 may determine whether to proceed with authentication of the UE based on the solution to the cryptographic puzzle. AUSF processor may determine to not proceed with authentication of the UE responsive to the solution to the cryptographic puzzle being incorrect, and based on such a determination, AUSF processor 1203 may stop authentication of the UE responsive to determining to not proceed. AUSF processor 1203 may also stop authentication of the UE if a response commit message is not received. In the alternative, AUSF processor 1203 may determine to proceed with authentication of the UE at block 309 responsive to the solution to the cryptographic puzzle being correct.

According to some embodiments, the request commit message 305 may include a request to provide a token, and the response commit message 307 includes an authentication priority token (previously provided by the AUSF node). In such embodiments, AUSF processor 1203 may determine at block 309 whether to proceed with authentication of the UE based on the authentication priority token. AUSF processor 1203 may determine to not proceed with authentication of the UE responsive to the authentication priority token being incorrect, and based on such a determination, processor may stop authentication of the UE. AUSF processor 1203 may also stop authentication of the UE if a response commit message is not received. In the alternative, AUSF processor 1203 may determine to proceed with authentication of the UE responsive to the authentication priority token being correct.

According to some other embodiments, the request commit message 305 may include a request for the UE to either provide a token or solve a cryptographic puzzle. In such embodiments, UE processor 1103 may determine whether to respond with a token or with a solution to the puzzle. If the UE has previously received an authentication priority token from the AUSF node in a previous authentication, the UE processor may send the response commit message including the authentication priority token to avoid solving the puzzle. If an authentication priority token is not available, the UE processor may solve the puzzle and send the response commit message including the solution to the puzzle. Accordingly, the responsive commit message 307 may include one of one of an authentication priority token or a solution to the cryptographic puzzle, and AUSF processor 1203 may determine whether to proceed with authentication of the UE based on the response commit message comprising the one of the authentication priority token or the solution to the cryptographic puzzle. If neither of a correct token or a correct solution to the puzzle is received with response commit message or if the response commit message is not received, AUSF processor may determine to not proceed with authentication of the UE, and AUSF processor may stop authentication of the UE responsive to determining to not proceed. In the alternative, AUSF processor 1203 may determine to proceed with authentication of the UE responsive to the response commit message including one of a correct authentication priority token or a correct solution to the cryptographic puzzle.

Responsive to determining to proceed at block 309, AUSF processor 1203 may decrypt the identifier for the UE from the authentication process start message at block 311. Based on decrypting the identifier, AUSF processor 1203 may transmit an authentication challenge message 311 (according to the EAP-AKA' protocol) through network interface 1207, through serving network AMF node, and through serving network base station to the UE.

While particular embodiments are discussed above with respect to FIG. 3, these embodiments are discussed only by way of example. For example, network node operations may be provided by a network node(s)/entity(ies)/server(s) in the home (or other) network and using a network node(s)/entity(ies)/server(s) other than an AUSF node. According to some other embodiments, an AMF node may be omitted, and/or another network node(s)/entity(ies)/server(s) may be used to relay messages.

Operations of the wireless device 1100 (implemented using the structure of the block diagram of FIG. 1) will now be discussed with reference to the flow chart of FIG. 13 according to some embodiments of inventive concepts. For example, modules may be stored in memory 1105 of FIG. 1, and these modules may provide instructions so that when the instructions of a module are executed by respective wireless device processing circuitry 1103, processing circuitry 1103 performs respective operations of the flow chart.

At block 1301, processing circuitry 1103 may transmit (through transceiver 1101) a first authentication process start message (also referred to as a previous authentication process start message) from the UE to the mobile communication network, wherein the first authentication process start message is for a first authentication, and wherein the first authentication process start message includes an identifier for the UE. For example, the identifier for the UE may be a SUbscription Concealed Identifier SUCI for the UE, e.g., containing a concealed SUbscription Permanent Identifier (SUPI) for the UE.

At block 1303, processing circuitry 1103 may receive (through transceiver 1101) a first authentication challenge message (also referred to as a previous authentication challenge message) for the first authentication corresponding to the first authentication process start message after transmitting the first authentication process start message. More particularly, the first authentication challenge message may be received without receiving a liveness check request and without transmitting a liveness check response between transmitting the first authentication process start message and receiving the first authentication challenge message.

At block 1311, processing circuitry 1103 may transmit (through transceiver 1101) a second authentication process start message (also referred to as a current authentication process start message) from the UE to the mobile communication network, wherein the authentication process start message includes the identifier for the UE (e.g., the SUCI containing the concealed SUPI).

At block 1313, processing circuitry 1103 may receive (through transceiver 1101) a liveness check request from the mobile communication network after transmitting the second authentication process start message from the UE.

At block 1315, processing circuitry 1103 may transmit (through transceiver 1101) a liveness check response to the mobile communication network responsive to receiving the request commit message.

At block 1317, processing circuitry 1103 may receive (through transceiver 1101) a second authentication challenge message (also referred to as a current authentication challenge message) corresponding to the second authentication process start message after transmitting the liveness check response.

Figure 13:
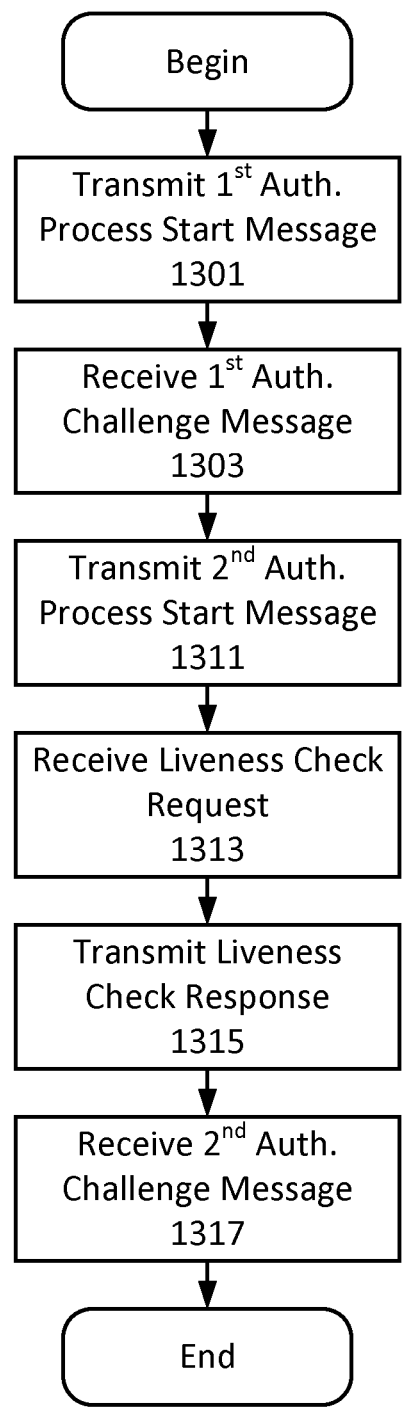
FIGS. 13, 15, 17, and 19 are flow charts illustrating operations of user equipment in accordance with some embodiments.

Various operations from the flow chart of FIG. 13 may be optional with respect to some embodiments of wireless devices and related methods. Regarding methods of example embodiment 39 (set forth below), for example, operations of blocks 1301 and/or 1303 of FIG. 13 may be optional.

Operations of a network node 1200 (implemented using the structure of FIG. 2) will now be discussed with reference to the flow chart of FIG. 14 according to some embodiments of inventive concepts. For example, modules may be stored in memory 1205 of FIG. 2, and these modules may provide instructions so that when the instructions of a module are executed by respective network node processing circuitry 1203, processing circuitry 1203 performs respective operations of the flow chart.

At block 1401, processing circuitry 1203 may wait to receive an authentication process start message from a UE, and at block 1402, processing circuitry 1203 may receive (through communication interface 1202) a first authentication process start message from a first user equipment (UE), wherein the first authentication process start message includes an identifier for the first UE. For example, the identifier for the UE may be a SUbscription Concealed Identifier SUCI for the UE, e.g., containing a concealed SUbscription Permanent Identifier (SUPI) for the UE.

At block 1403, processing circuitry 1203 may transmit (through communication interface 1202) a first liveness check to the first UE responsive to receiving the first authentication process start message from the first UE. According to some embodiments, the first liveness check may be transmitted responsive to receiving the first authentication process start message and responsive to at least one of: a load of authentication process start messages exceeding a threshold; and/or a risk assessment, for example, based on a risk for denial-of-service attack.

At blocks 1405 and 1407, processing circuitry 1203 may wait to receive a liveness check response responsive to the liveness check request to determine whether to proceed with authentication. Responsive to receiving a first liveness check response from the first UE at blocks 1405 and 1407, processing circuitry 1203 may determine to proceed with authentication, decrypt the identifier for the first UE from the first authentication process start message at block 1409, and transmit (through communication interface 1202) an authentication challenge message to the first UE at block 1411 based on decrypting the identifier for the first UE.

At blocks 1401 and 1402, processing circuitry 1203 may receive (through communication interface 1202) a second authentication process start message from a second UE, wherein the second authentication process start message includes a second identifier for the second UE.

At block 1403, processing circuitry 1203 may transmit a second liveness check request to the second UE responsive to receiving the second authentication process start message from the second UE.

At blocks 1405 and 1407, processing circuitry 1203 may wait to receive a liveness check response responsive to the second liveness check request to determine whether to proceed with authentication of the second UE. Responsive to failure receiving a second liveness check response from the second UE corresponding to the second liveness check request, processing circuitry 1203 may determine to not proceed with authentication of the second UE, and processing circuitry 1203 may thus stop authentication of the second UE at block 1415.

Figure 14:
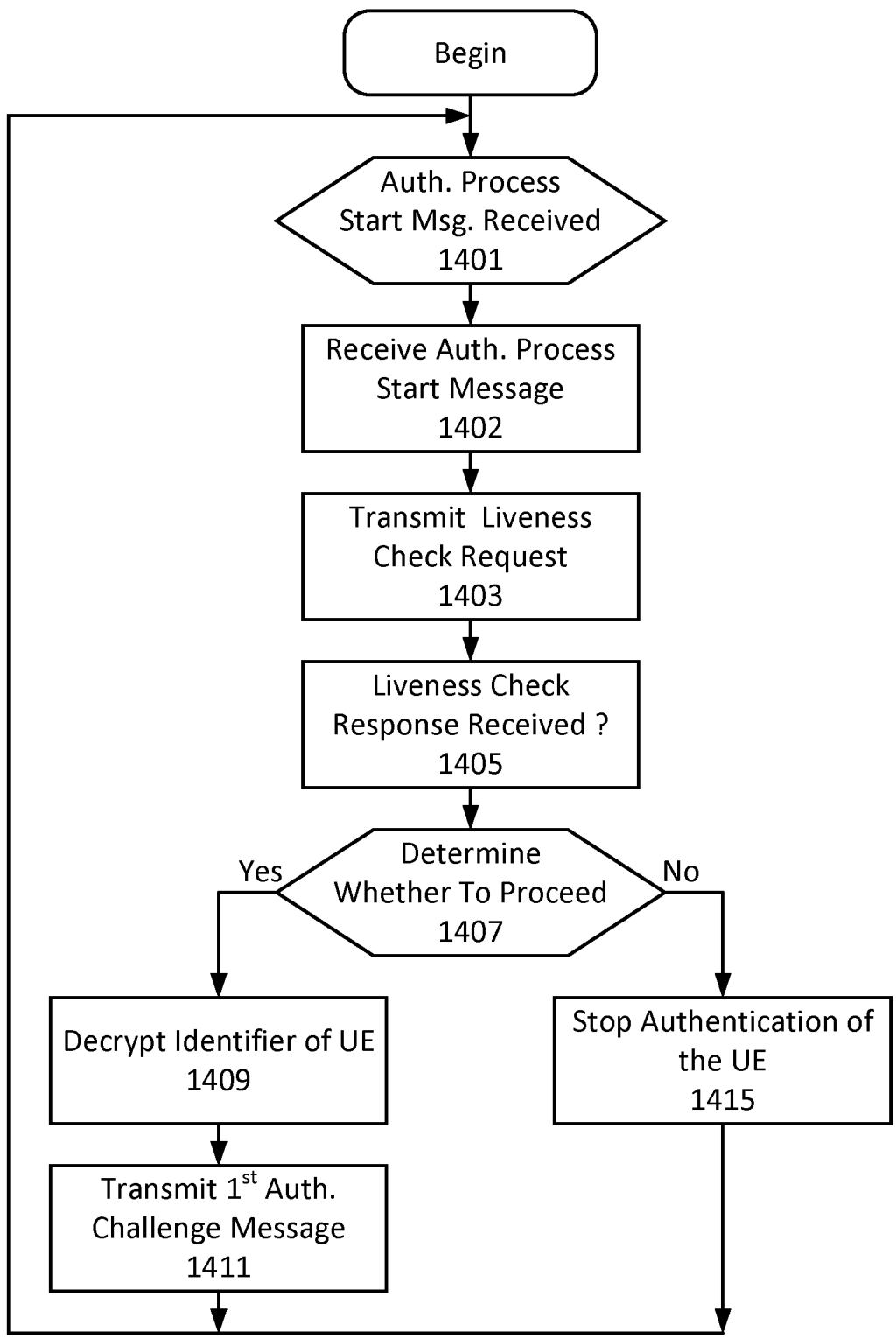
FIGS. 14, 16, 18, and 20 are flow charts illustrating operations of network nodes in accordance with some embodiments.

Various operations from the flow chart of FIG. 14 may be optional with respect to some embodiments of network nodes and related methods. Regarding methods of example embodiment 1 (set forth below), for example, operations of blocks 1401, 1409, 1411, and/or 1415 of FIG. 14 may be optional.

Operations of the wireless device 1100 (implemented using the structure of the block diagram of FIG. 1) will now be discussed with reference to the flow chart of FIG. 15 according to some embodiments of inventive concepts. For example, modules may be stored in memory 1105 of FIG. 1, and these modules may provide instructions so that when the instructions of a module are executed by respective wireless device processing circuitry 1103, processing circuitry 1103 performs respective operations of the flow chart.

At block 1501, processing circuitry 1103 may transmit (through transceiver 1101) a first authentication process start message (also referred to as a previous authentication process start message) from the UE to the mobile communication network, wherein the first authentication process start message is for a first authentication, and wherein the first authentication process start message includes an identifier for the UE. For example, the identifier for the UE may be a SUbscription Concealed Identifier SUCI for the UE, e.g., containing a concealed SUbscription Permanent Identifier (SUPI) for the UE.

At block 1503, processing circuitry 1103 may receive (through transceiver 1101) a first authentication challenge message (also referred to as a previous authentication challenge message) for the first authentication corresponding to the first authentication process start message after transmitting the first authentication process start message. More particularly, the first authentication challenge message may be received without receiving a request to solve a cryptographic puzzle and without transmitting a solution to a cryptographic puzzle between transmitting the first authentication process start message and receiving the first authentication challenge message.

At block 1511, processing circuitry 1103 may transmit (through transceiver 1101) a second authentication process start message from the UE to the mobile communication network, wherein the second authentication process start message includes the identifier for the UE (e.g., the SUCI containing the concealed SUPI).

At block 1513, processing circuitry 1103 may receive (through transceiver 1101) a request to solve a cryptographic puzzle from the mobile communication network after transmitting the authentication process start message from the UE.

At block 1515, processing circuitry 1103 may transmit (through transceiver 1101) a solution to the cryptographic puzzle to the mobile communication network responsive to receiving the request to solve the cryptographic puzzle.

According to some embodiments, the request to solve a cryptographic puzzle may be a request to provide a token or solve a cryptographic puzzle. In such embodiments, processing circuitry 1103 may determine whether an authentication priority token for the mobile communication network is available, and processing circuitry 1103 may transmit the solution to the cryptographic puzzle at block 1515 responsive to determining that an authentication priority token for the mobile communication network is not available.

At block 1517, processing circuitry 1103 may receive (through transceiver 1101) an authentication challenge message corresponding to the authentication process start message after transmitting the solution to the cryptographic puzzle.

Figure 15:
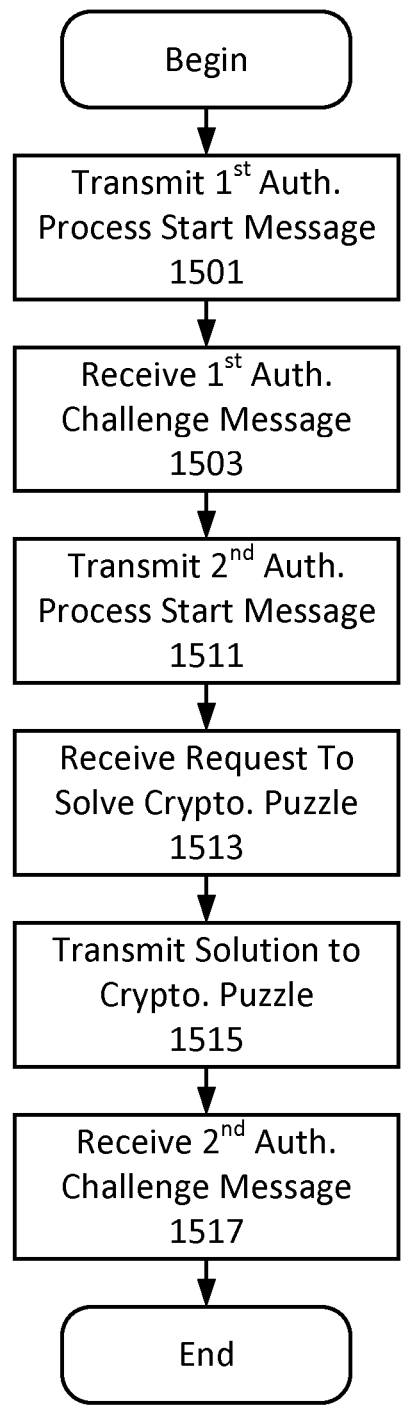

Various operations from the flow chart of FIG. 15 may be optional with respect to some embodiments of wireless devices and related methods. Regarding methods of example embodiment 39 (set forth below), for example, operations of blocks 1501 and/or 1503 of FIG. 15 may be optional.

Operations of a network node 1200 (implemented using the structure of FIG. 2) will now be discussed with reference to the flow chart of FIG. 16 according to some embodiments of inventive concepts. For example, modules may be stored in memory 1205 of FIG. 2, and these modules may provide instructions so that when the instructions of a module are executed by respective network node processing circuitry 1203, processing circuitry 1203 performs respective operations of the flow chart.

At block 1601, processing circuitry 1203 may wait to receive an authentication process start message, and at block 1602, processing circuitry 1203 may receive (through communication interface 1202) an authentication process start message from a first user equipment (UE), wherein the authentication process start message includes an identifier for the first UE. For example, the identifier for the UE may be a SUbscription Concealed Identifier SUCI for the UE, e.g., containing a concealed SUbscription Permanent Identifier (SUPI) for the UE.

At block 1603, processing circuitry 1203 may transmit (through communication interface 1202) a first request to solve a cryptographic puzzle to the first UE responsive to receiving the first authentication process start message from the first UE. According to some embodiments, the first request to solve a cryptographic puzzle may be transmitted responsive to receiving the first authentication process start message and responsive to at least one of: a load of authentication process start messages exceeding a threshold; and/or a risk assessment, for example, based on a risk for denial-of-service attack. According to some embodiments, the request to solve a cryptographic puzzle may be a request to provide a token or to solve a cryptographic puzzle.

At blocks 1605 and 1607, processing circuitry 1203 may wait to receive a solution to the cryptographic puzzle responsive to the request to solve the cryptographic puzzle to determine whether to proceed with authentication. If the solution is correct, processing circuitry 1203 may determine to proceed with authentication, or if the solution is incorrect, processing circuitry 1203 may determine to not proceed with authentication. Responsive to receiving a first solution to the cryptographic puzzle from the first UE that is correct at blocks 1605 and 1607, processing circuitry 1203 may determine to proceed with authentication, decrypt the identifier for the first UE from the first authentication process start message at block 1609, and transmit (through communication interface 1202) an authentication challenge message to the first UE at block 1611 based on decrypting the identifier for the first UE.

At blocks 1601 and 1602, processing circuitry 1203 may receive (through communication interface 1202) a second authentication process start message from a second UE, wherein the second authentication process start message includes a second identifier for the second UE.

At block 1603, processing circuitry 1203 may transmit a second request to solve a cryptographic puzzle to the second UE responsive to receiving the second authentication process start message from the second UE.

At blocks 1605 and 1607, processing circuitry 1203 may wait to receive a solution to the cryptographic puzzle responsive to the second request to solve a cryptographic puzzle to determine whether to proceed with authentication of the second UE. Responsive to failure receiving a correct solution to the cryptographic puzzle responding to the second request to solve a cryptographic puzzle from the second UE, processing circuitry 1203 may determine to not proceed with authentication of the second UE, and processing circuitry 1203 may thus stop authentication of the second UE at block 1615.

Figure 16:
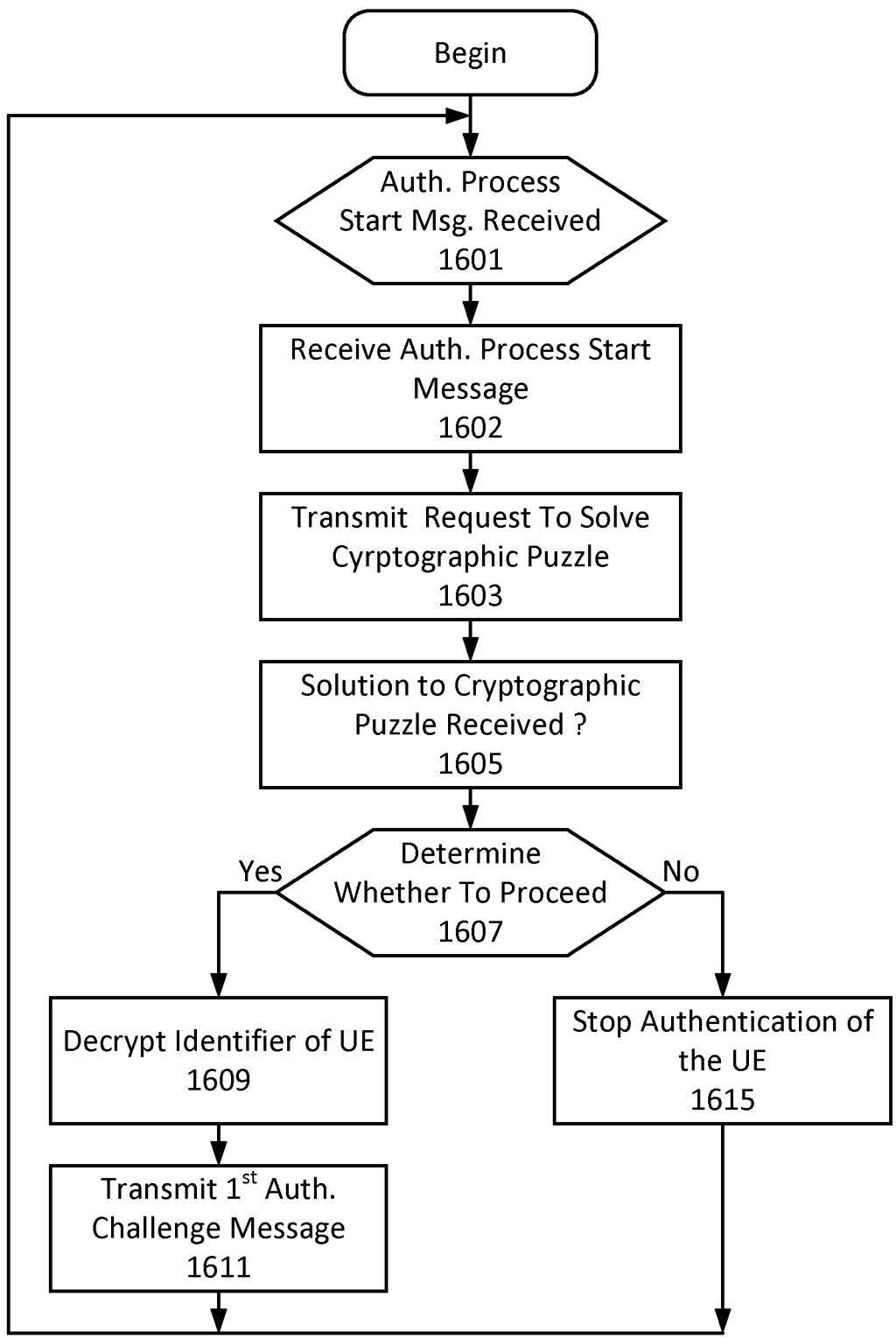

Various operations from the flow chart of FIG. 16 may be optional with respect to some embodiments of network nodes and related methods. Regarding methods of example embodiment 1 (set forth below), for example, operations of blocks 1601, 1609, 1611, and/or 1615 of FIG. 16 may be optional.

Operations of the wireless device 1100 (implemented using the structure of the block diagram of FIG. 1) will now be discussed with reference to the flow chart of FIG. 17 according to some embodiments of inventive concepts. For example, modules may be stored in memory 1105 of FIG. 1, and these modules may provide instructions so that when the instructions of a module are executed by respective wireless device processing circuitry 1103, processing circuitry 1103 performs respective operations of the flow chart.

At block 1701, processing circuitry 1103 may transmit (through transceiver 1101) a first authentication process start message (also referred to as a previous authentication process start message) from the UE to the mobile communication network, wherein the first authentication process start message is for a first authentication, and wherein the first authentication process start message includes an identifier for the UE. For example, the identifier for the UE may be a SUbscription Concealed Identifier SUCI for the UE, e.g., containing a concealed SUbscription Permanent Identifier (SUPI) for the UE.

At block 1703, processing circuitry 1103 may receive (through transceiver 1101) a first authentication challenge message (also referred to as a previous authentication challenge message) for the first authentication corresponding to the first authentication process start message after transmitting the first authentication process start message. More particularly, the first authentication challenge message may be received without receiving a request to provide a token and without transmitting an authentication priority token between transmitting the first authentication process start message and receiving the first authentication challenge message.

At block 1711, processing circuitry 1103 may transmit (through transceiver 1101) a second authentication process start message (also referred to as a current authentication process start message) from the UE to the mobile communication network, wherein the authentication process start message includes the identifier for the UE (e.g., the SUCI containing the concealed SUPI).

At block 1713, processing circuitry 1103 may receive (through transceiver 1101) a request to provide a token from the mobile communication network after transmitting the second authentication process start message from the UE.

At block 1715, processing circuitry 1103 may transmit (through transceiver 1101) an authentication priority token to the mobile communication network responsive to receiving the request to provide a token. For example, an authentication priority token may be received during the first authentication process of blocks 1701 and 1703.

According to some embodiments, the request to solve a cryptographic puzzle may be a request to provide a token or solve a cryptographic puzzle. In such embodiments, processing circuitry 1103 may determine whether an authentication priority token for the mobile communication network is available, and processing circuitry 1103 may transmit the authentication priority token at block 1715 responsive to determining that an authentication priority token for the mobile communication network is available. For example, an authentication priority token may be received from the mobile communication network during the authentication process of blocks 1701 and 1703.

At block 1717, processing circuitry 1103 may receive (through transceiver 1101) a second authentication challenge message (also referred to as a current authentication challenge message) corresponding to the second authentication process start message after transmitting the authentication priority token.

Figure 17:
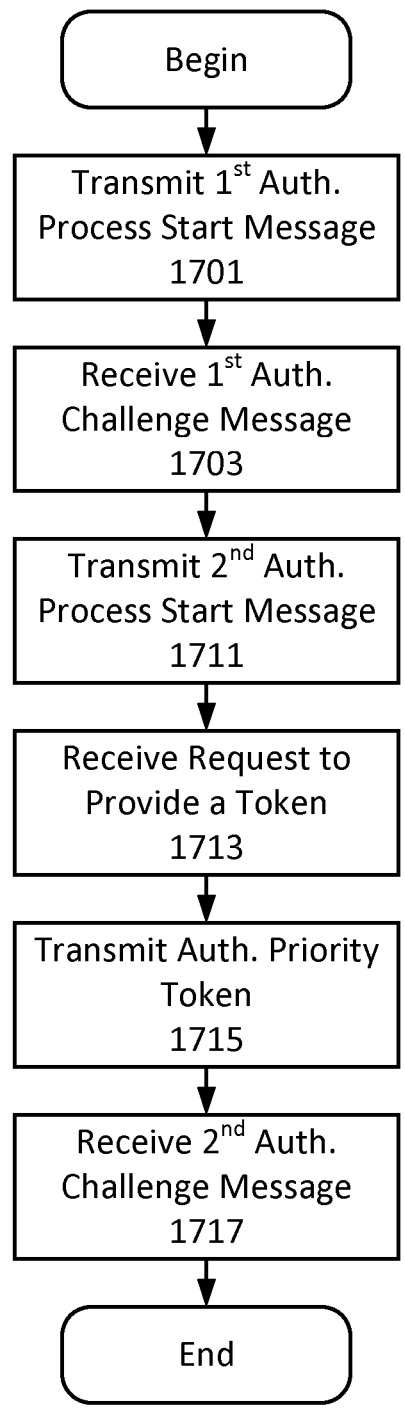

Various operations from the flow chart of FIG. 17 may be optional with respect to some embodiments of wireless devices and related methods. Regarding methods of example embodiment 39 (set forth below), for example, operations of blocks 1701 and/or 1703 of FIG. 17 may be optional.

Operations of a network node 1200 (implemented using the structure of FIG. 2) will now be discussed with reference to the flow chart of FIG. 18 according to some embodiments of inventive concepts. For example, modules may be stored in memory 1205 of FIG. 2, and these modules may provide instructions so that when the instructions of a module are executed by respective network node processing circuitry 1203, processing circuitry 1203 performs respective operations of the flow chart.

At block 1801, processing circuitry 1203 may wait to receive an authentication process start message from a UE, and at block 1402, processing circuitry 1203 may receive (through communication interface 1202) a first authentication process start message from a first user equipment (UE), wherein the first authentication process start message includes an identifier for the first UE. For example, the identifier for the UE may be a SUbscription Concealed Identifier SUCI for the UE, e.g., containing a concealed SUbscription Permanent Identifier (SUPI) for the UE.

At block 1803, processing circuitry 1203 may transmit (through communication interface 1202) a request to provide a token to the first UE responsive to receiving the first authentication process start message from the first UE. According to some embodiments, the request to provide a token may be transmitted responsive to receiving the first authentication process start message and responsive to at least one of: a load of authentication process start messages exceeding a threshold; and/or a risk assessment, for example, based on a risk for denial-of-service attack. According to some embodiments, the request to provide a token may be a request to provide a token or to solve a cryptographic puzzle.

At blocks 1805 and 1807, processing circuitry 1203 may wait to receive an authentication priority token responsive to the request to provide a token to determine whether to proceed with authentication. If a correct authentication priority token is received at block 1805, processing circuitry 1203 may proceed with authentication, but if no authentication priority token is received or if an incorrect authentication priority token is received, processing circuitry 1203 may stop authentication. Responsive to receiving a correct authentication priority token from the first UE at blocks 1805 and 1807, processing circuitry 1203 may determine to proceed with authentication, decrypt the identifier for the first UE from the first authentication process start message at block 1409, and transmit (through communication interface 1202) an authentication challenge message to the first UE at block 1411 based on decrypting the identifier for the first UE.

At blocks 1801 and 1802, processing circuitry 1203 may receive (through communication interface 1202) a second authentication process start message from a second UE, wherein the second authentication process start message includes a second identifier for the second UE.

At block 1803, processing circuitry 1203 may transmit a second request to provide a token to the second UE responsive to receiving the second authentication process start message from the second UE.

At blocks 1805 and 1807, processing circuitry 1203 may wait to receive an authentication priority token responsive to the request to provide a token to determine whether to proceed with authentication of the second UE. Responsive to failure receiving a correct authentication priority token or failure to receive any authentication priority token from the second UE corresponding to the second request to provide a token, processing circuitry 1203 may determine to not proceed with authentication of the second UE, and processing circuitry 1203 may thus stop authentication of the second UE at block 1815.

Figure 18:
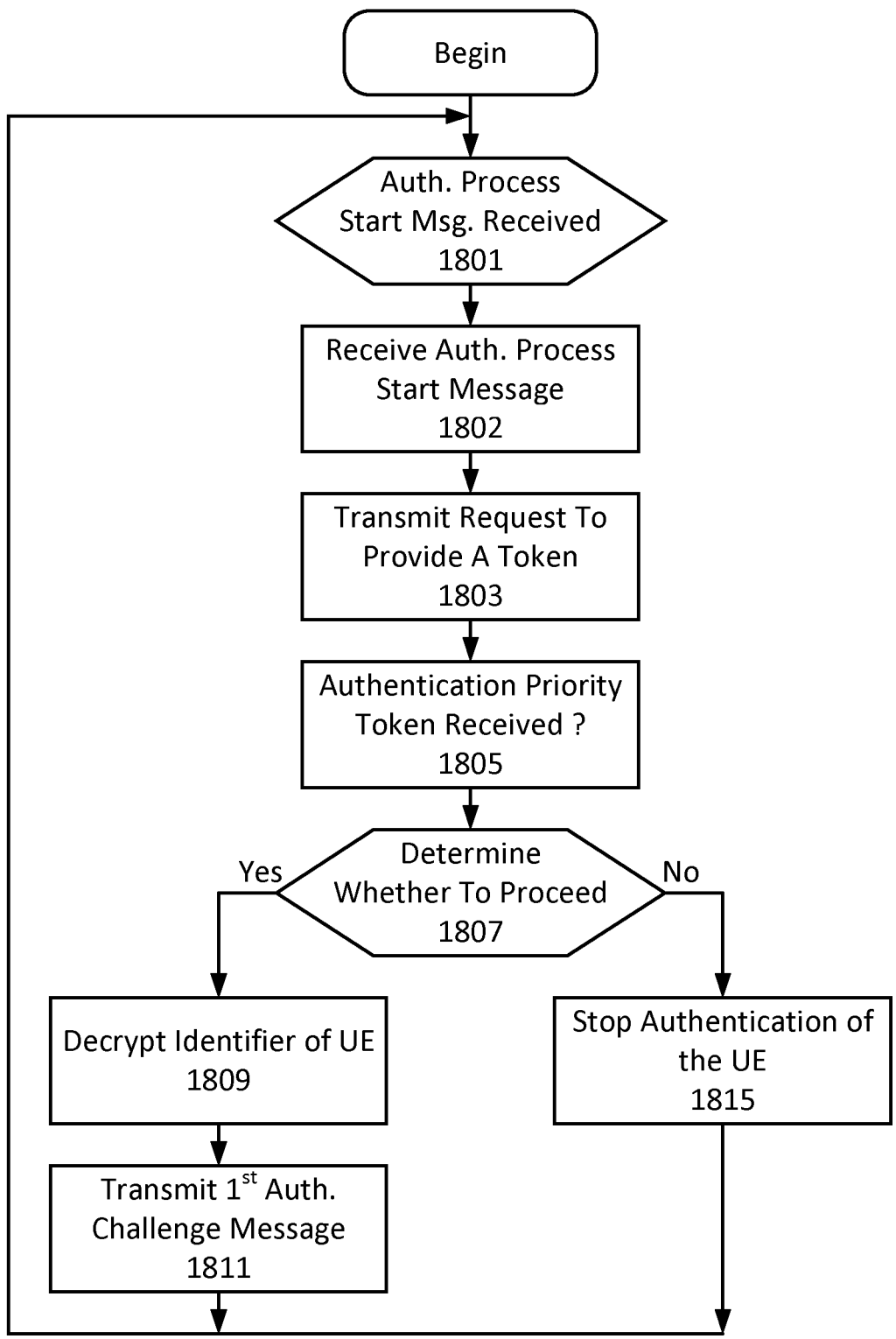

Various operations from the flow chart of FIG. 18 may be optional with respect to some embodiments of network nodes and related methods. Regarding methods of example embodiment 1 (set forth below), for example, operations of blocks 1801, 1809, 1811, and/or 1815 of FIG. 18 may be optional.

Operations of the wireless device 1100 (implemented using the structure of the block diagram of FIG. 1) will now be discussed with reference to the flow chart of FIG. 19 according to some embodiments of inventive concepts. For example, modules may be stored in memory 1105 of FIG. 1, and these modules may provide instructions so that when the instructions of a module are executed by respective wireless device processing circuitry 1103, processing circuitry 1103 performs respective operations of the flow chart.

At block 1911, processing circuitry 1103 may transmit (through transceiver 1101) an authentication process start message (also referred to as a current authentication process start message) from the UE to the mobile communication network, wherein the authentication process start message includes an identifier for the UE (e.g., a SUCI containing a concealed SUPI).

At block 1913, processing circuitry 1103 may receive (through transceiver 1101) a request commit message from the mobile communication network after transmitting the authentication process start message from the UE. For example, the request commit message may include a liveness check request, a request to solve a cryptographic puzzle, and/or a request to provide a token.

At block 1915, processing circuitry 1103 may transmit (through transceiver 1101) a response commit message to the mobile communication network responsive to receiving the request commit message. For example, the response commit message may include a liveness check response, a solution to a cryptographic puzzle, and/or an authentication priority token.

At block 1917, processing circuitry 1103 may receive (through transceiver 1101) a authentication challenge message (also referred to as a current authentication challenge message) corresponding to the authentication process start message after transmitting the response commit message.

Figure 19:
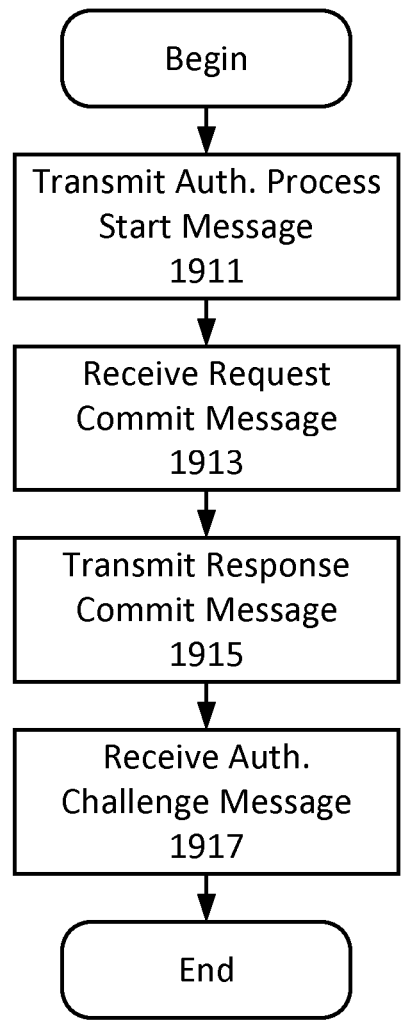

Various operations from the flow chart of FIG. 19 may be optional with respect to some embodiments of wireless devices and related methods.

Operations of a network node 1200 (implemented using the structure of FIG. 2) will now be discussed with reference to the flow chart of FIG. 20 according to some embodiments of inventive concepts. For example, modules may be stored in memory 1205 of FIG. 2, and these modules may provide instructions so that when the instructions of a module are executed by respective network node processing circuitry 1203, processing circuitry 1203 performs respective operations of the flow chart.

At block 2002, processing circuitry 1203 may receive (through communication interface 1202) a first authentication process start message from a first user equipment (UE), wherein the first authentication process start message includes an identifier for the first UE. For example, the identifier for the UE may be a SUbscription Concealed Identifier SUCI for the UE, e.g., containing a concealed SUbscription Permanent Identifier (SUPI) for the UE.

At block 2003, processing circuitry 1203 may transmit (through communication interface 1202) a first request commit message to the first UE responsive to receiving the first authentication process start message from the first UE. According to some embodiments, the first request commit message may be transmitted responsive to receiving the first authentication process start message and responsive to at least one of: a load of authentication process start messages exceeding a threshold; and/or a risk assessment, for example, based on a risk for denial-of-service attack. For example, the first request commit message may include a liveness check request, a request to solve a cryptographic puzzle, and/or a request to provide a token.

At blocks 2005 and 2007, processing circuitry 1203 may wait to receive a first response commit message responsive to the first request commit message to determine whether to proceed with authentication. For example, the first response commit message may include a liveness check response, a solution to a cryptographic puzzle, and/or an authentication priority token. Responsive to receiving a first response commit message from the first UE at blocks 2005 and 2007, processing circuitry 1203 may determine to proceed with authentication, decrypt the identifier for the first UE from the first authentication process start message at block 2009, and transmit (through communication interface 1202) an authentication challenge message to the first UE at block 2011 based on decrypting the identifier for the first UE.

At blocks 2001 and 2002, processing circuitry 1203 may receive (through communication interface 1202) a second authentication process start message from a second UE, wherein the second authentication process start message includes a second identifier for the second UE.

At block 2003, processing circuitry 1203 may transmit a second request commit message to the second UE responsive to receiving the second authentication process start message from the second UE.

At blocks 2005 and 2007, processing circuitry 1203 may wait to receive a response commit message responsive to the second request commit message to determine whether to proceed with authentication of the second UE. Responsive to failure receiving a second response commit message response from the second UE corresponding to the second request commit message, processing circuitry 1203 may determine to not proceed with authentication of the second UE, and processing circuitry 1203 may thus stop authentication of the second UE at block 2015.

Figure 20:
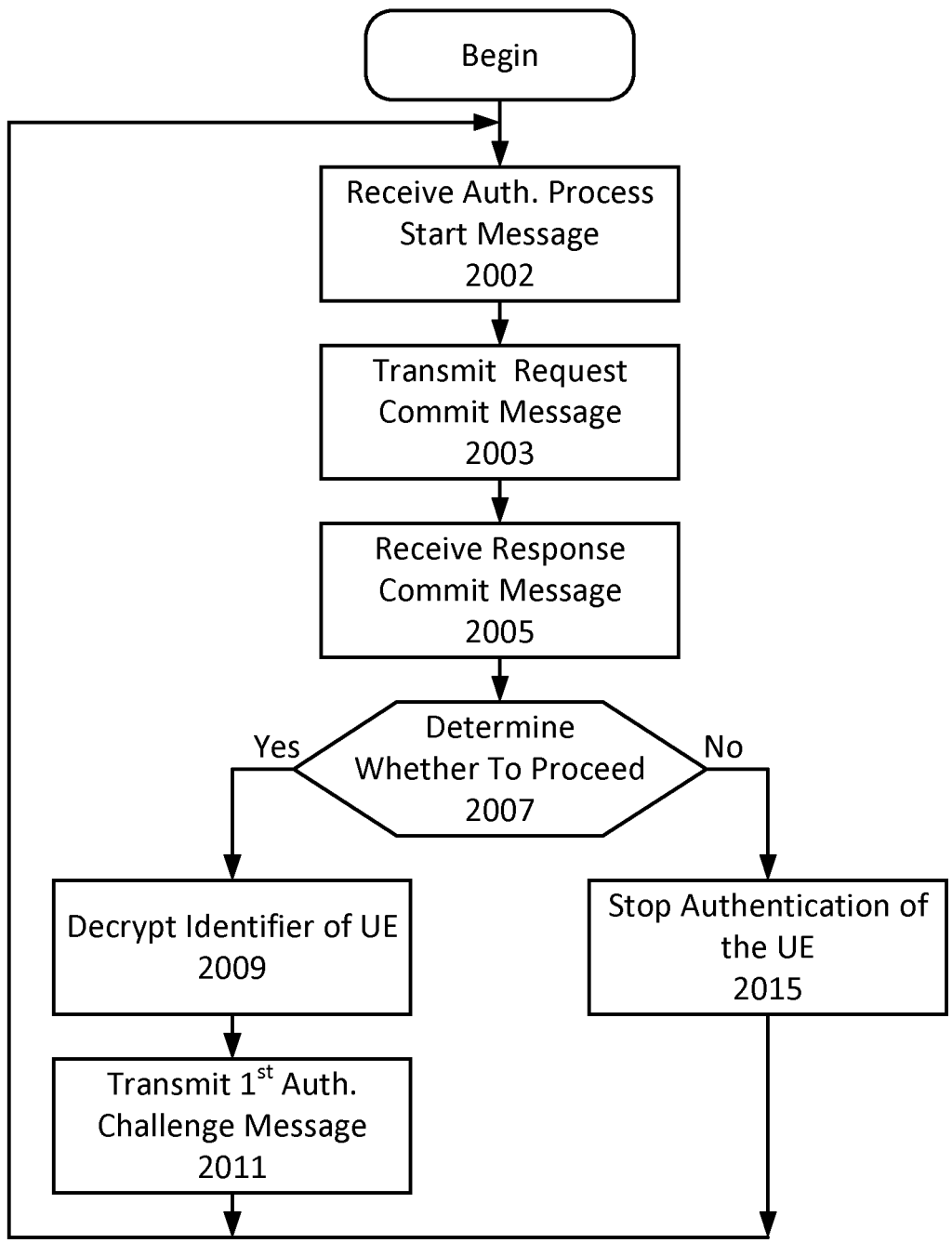

Various operations from the flow chart of FIG. 20 may be optional with respect to some embodiments of network nodes and related methods.

Example embodiments of inventive concepts are set forth below.

1. A method of operating a network node of a mobile communication network, the method comprising: receiving (301) an authentication process start message from a user equipment (UE), wherein the authentication process start message includes an identifier for the UE; responsive to receiving the authentication process start message from the UE, transmitting (305) request commit message to the UE; after transmitting the request commit message, receiving (307) a response commit message from the UE; and determining (309) whether to proceed with authentication of the UE based on the response commit message.

2. The method of Embodiment 1, wherein the request commit message comprises a liveness check request, wherein the response commit message comprises a liveness check response, and wherein determining comprises determining to proceed with authentication of the UE based on receiving the liveness check response.

3. The method of Embodiment 1, wherein the request commit message comprises a request to solve a cryptographic puzzle, wherein the response commit message comprise a solution to the cryptographic puzzle, and wherein determining comprises determining whether to proceed with authentication of the UE based on the solution to the cryptographic puzzle.

4. The method of Embodiment 3, wherein determining comprises determining to not proceed with authentication of the UE responsive to the solution to the cryptographic puzzle being incorrect, the method further comprising: stopping authentication of the UE responsive to determining to not proceed.

5. The method of Embodiment 3, wherein determining comprises determining to proceed with authentication of the UE responsive to the solution to the cryptographic puzzle being correct.

6. The method of Embodiment 1, wherein the request commit message comprises a request to provide a token, wherein the response commit message comprises an authentication priority token, and wherein determining comprises determining whether to proceed with authentication of the UE based on the authentication priority token.

7. The method of Embodiment 6, wherein determining comprises determining to not proceed with authentication of the UE responsive to the authentication priority token being incorrect, the method further comprising: stopping authentication of the UE responsive to determining to not proceed.

8. The method of Embodiment 6, wherein determining comprises determining to proceed with authentication of the UE responsive to the authentication priority token being correct.

9. The method of Embodiment 1, wherein the request commit message comprises a request to either provide a token or solve a cryptographic puzzle, wherein the response commit message comprises one of an authentication priority token or a solution to the cryptographic puzzle, and wherein determining comprises determining whether to proceed with authentication of the UE based on the response commit message comprising the one of the authentication priority token or the solution to the cryptographic puzzle.

10. The method of Embodiment 9, wherein determining comprises determining to not proceed with authentication of the UE responsive to the response commit message including one of an incorrect authentication priority token or an incorrect solution to the cryptographic puzzle, the method further comprising: stopping authentication of the UE responsive to determining to not proceed.

11. The method of Embodiment 9, wherein determining comprises determining to proceed with authentication of the UE responsive to the response commit message including one of a correct authentication priority token or a correct solution to the cryptographic puzzle.

12. The method of any of Embodiments 2, 5, 8, and/or 11, further comprising: responsive to determining to proceed, transmitting (313) an authentication challenge message to the UE.

13. The method of Embodiment 12 further comprising: responsive to determining to proceed, decrypting (311) the identifier for the UE from the authentication process start message; wherein transmitting the authentication challenge message is transmitted based on decrypting the identifier.

14. The method of any of Embodiments 1-2, wherein the authentication process start message is a first authentication start message, wherein the UE is a first UE, and wherein the request commit message is a first request commit message, the method further comprising: receiving a second authentication process start message from a second UE, wherein the second authentication process start message includes a second identifier for the second UE; responsive to receiving the second authentication process start message from the second UE, transmitting second request commit message to the second UE; and responsive to failure receiving a second response commit message form the second UE corresponding to the second request commit message, stopping authentication of the second UE.

15. The method of Embodiment 14, wherein the second request commit message comprises a liveness check request.

16. The method of any of Embodiments 1-15, wherein the communication network comprises a home network for the UE, where the authentication process start message is received via a second network node of a serving network for the UE, wherein the request commit message is transmitted via the second network node, and wherein the response commit message is received via the second network node.

17. The method of Embodiment 16, wherein the second network node comprises an Access and Mobility Management Function (AMF) node of the serving network.

18. The method of any of Example Embodiments 1-17, wherein the network node comprises an authentication server function (AUSF) node.

19. The method of any of Embodiments 1-18, wherein the identifier for the UE comprises a SUbscription Concealed Identifier (SUCI) for the UE.

20. The method of Embodiment 19, wherein the SUCI contains a concealed SUbscription Permanent Identifier (SUPI) for the UE.

21. The method of any of Embodiments 1-20, wherein transmitting the request commit message comprises transmitting the request commit message to the UE responsive to receiving the authentication process start message and responsive to a load of authentication process start messages exceeding a threshold.

22. The method of any of Embodiments 1-20, wherein transmitting the request commit message comprises transmitting the request commit message to the UE responsive to receiving the authentication process start message and responsive to a risk assessment.

23. The method of Embodiment 22, wherein the risk assessment is based on a risk for denial-of-service attack.

24. The method of any of Embodiments 1-23, wherein the authentication process start message is provided according to an EAP-AKA' protocol.

25. The method of any of Embodiments 1-24, wherein the request commit message and the response commit message are provided within an EAP-AKA' protocol.

26. The method of any of Embodiments 12 and 16-25, wherein the authentication challenge message is provided according to an EAP-AKA' protocol.

27. The method of any of Embodiments 6-8, wherein the authentication priority token includes a message authentication code (MAC) protecting an integrity a reminder of the authentication priority token, wherein the MAC is constructed using a symmetric cryptographic secret key that is only known by the network node.

28. The method of Embodiment 27, wherein the authentication priority token includes a token identifier for a one-time usable token.

29. The method of Embodiment 27, wherein the network node periodically changes the secret key used in the message authentication code, identifying each key with an index, i, and including the index i in the authentication priority token.

30. The method of any of Embodiments 6-8, where the authentication priority token is a message that contains a message authentication code (MAC) protecting the integrity of the rest of the message, constructed using a symmetric cryptography secret key that is only known by the authentication server.

31. The method of embodiment 30, where the message contains a token identifier for a one-time usable token.

32. The method of embodiment 30, where the authentication server changes periodically the secret key used in the message authentication code, identifying each key with an index i, and including the index i in the message compromising the token.

33. The method of Embodiment 8 further comprising: transmitting the authentication priority token to the UE before receiving the authentication process start message from the UE.

34. The method of Embodiment 33, wherein the authentication priority token is transmitted UE during a previous successful authentication of the UE before receiving the authentication process start message from the UE.

35. A network node (1200) of a mobile communication network, the network node comprising: a processor (1203); and memory (1205) coupled with the processor, wherein the memory includes instructions that when executed by the processor causes the node to perform operations according to any of Embodiments 1-34.

36. A network node (1200) of a mobile communication network, wherein the network node is adapted to perform according to any of Embodiments 1-34.

37. A computer program comprising program code to be executed by at least one processor (1203) of a network node (1200) of a mobile communication network, whereby execution of the program code causes the network node (1200) to perform operations according to any one of embodiments 1-34.

38. A computer program product comprising a non-transitory storage medium including program code to be executed by at least one processor (1203) of a network node (1200) of a mobile communication network, whereby execution of the program code causes the network node (1200) to perform operations according to any one of embodiments 1-34.

39. A method of operating a user equipment (UE) in a mobile communication network, the method comprising: transmitting an authentication process start message from the UE to the mobile communication network, wherein the authentication process start message includes an identifier for the UE; after transmitting the authentication process start message from the UE, receiving a request commit message from the mobile communication network; responsive to receiving the request commit message, transmitting a response commit message to the mobile communication network; and after transmitting the response commit message, receiving an authentication challenge message corresponding to the authentication process start message.

40. The method of Embodiment 39, wherein the request commit message comprises a liveness check request, and wherein the response commit message comprises a liveness check response.

41. The method of Embodiment 39, wherein the request commit message comprises a request to solve a cryptographic puzzle, and wherein the response commit message comprise a solution to the cryptographic puzzle.

42. The method of Embodiment 39, wherein the request commit message comprises a request to provide a token, and wherein the response commit message comprises an authentication priority token.

43. The method of Embodiment 39, wherein the request commit message comprises a request to either provide a token or solve a cryptographic puzzle, wherein the response commit message comprises one of an authentication priority token or a solution to the cryptographic puzzle.

44. The method of Embodiment 43 further comprising: determining whether an authentication priority token for the mobile communication network is available; wherein transmitting the response commit message comprises transmitting the response commit message comprising the authentication priority token responsive to determining that the authentication priority token is available.

45. The method of Embodiment 43 further comprising: determining whether an authentication priority token for the mobile communication network is available; wherein transmitting the response commit message comprises transmitting the response commit message comprising the solution to the cryptographic puzzle responsive to determining that the authentication priority token is not available.

46. The method of any of Embodiments 39-45, wherein the communication network comprises a home network for the UE, wherein the authentication process start message is transmitted to an authentication server function (AUSF) node of the home network, wherein the request commit message is received from the AUSF node, and wherein the response commit message is transmitted to the AUSF node.

47. The method of Embodiment 46, wherein the network node is an authentication server function (AUSF) node.

48. The method of any of Embodiments 46-47, wherein the network node is a first network node, wherein the authentication process start message is transmitted via a second network node of a serving network for the UE, wherein the request commit message is received via the second network node, and wherein the response commit message is transmitted via the second network node.

49. The method of Embodiment 48, wherein the second network node comprises an Access and Mobility Management Function (AMF) node of the serving network.

50. The method of any of Embodiments 39-49, wherein the identifier for the UE comprises a SUbscription Concealed Identifier (SUCI) for the UE.

51. The method of Embodiment 50, wherein the SUCI contains a concealed SUbscription Permanent Identifier (SUPI) for the UE.

52. The method of any of Embodiments 39-51, wherein the authentication process start message, the request commit message, the response commit message, and the authentication challenge are messages of a current authentication, the method further comprising: transmitting a previous authentication process start message from the UE to the mobile communication network, wherein the previous authentication process start message is for a previous authentication, wherein the previous authentication process start message includes the identifier for the UE; and after transmitting the previous authentication process start message, receiving a previous authentication challenge message corresponding to the previous authentication process start message, without receiving a request commit message and without transmitting a response commit message between transmitting the previous authentication process start message and receiving the previous authentication challenge message, wherein the previous authentication challenge message is for the previous authentication.

53. The method of Embodiment 52, wherein an authentication priority token is received from the mobile communication network during the previous authentication process, wherein the request commit response comprises a request to provide a token, and wherein the response commit message comprises the authentication priority token.

54. The method of any of Embodiments 39-53, wherein the request commit message is transmitted from the mobile communication network based on a determination regarding a load of authentication process start messages and/or a risk of a denial-of-service attack.

55. The method of any of Embodiments 39-54, wherein the authentication process start message and the authentication challenge message are provided according to an EAP-AKA' protocol.

56. The method of any of Embodiments 39-55, wherein the request commit message and the response commit message are provided within an EAP-AKA' protocol.

57. A user equipment, UE, (1100) comprising: a processor (1103); and memory (1105) coupled with the processor, wherein the memory includes instructions that when executed by the processor causes the UE to perform operations according to any of Embodiments 39-56.

58. A UE (1100) wherein the UE (1100) is adapted to perform according to any of Embodiments 39-56.

59. A computer program comprising program code to be executed by at least one processor (1103) of a UE (1100), whereby execution of the program code causes the UE (1100) to perform operations according to any one of embodiments 39-56.

60. A computer program product comprising a non-transitory storage medium including program code to be executed by at least one processor (1103) of a UE (1100), whereby execution of the program code causes the UE (1100) to perform operations according to any one of embodiments 39-56.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 4:
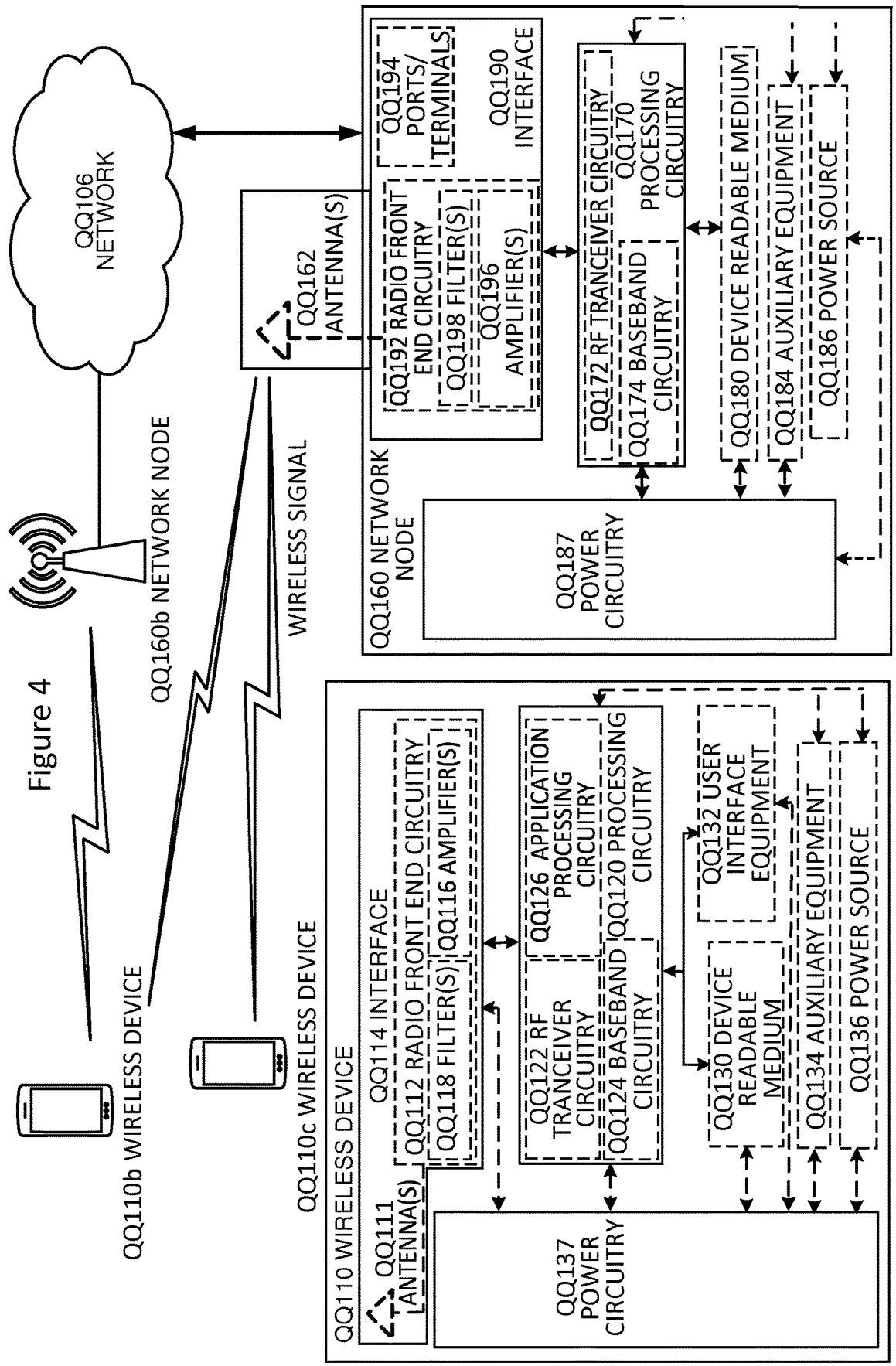
FIG. 4 is a block diagram of a wireless network in accordance with some embodiments.

FIG. 4: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 4. For simplicity, the wireless network of FIG. 4 only depicts network QQ106, network nodes QQ160 and QQ160*b*, and WDs QQ110, QQ110*b*, and QQ110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 4 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 4 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more ofRF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/ or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 5:
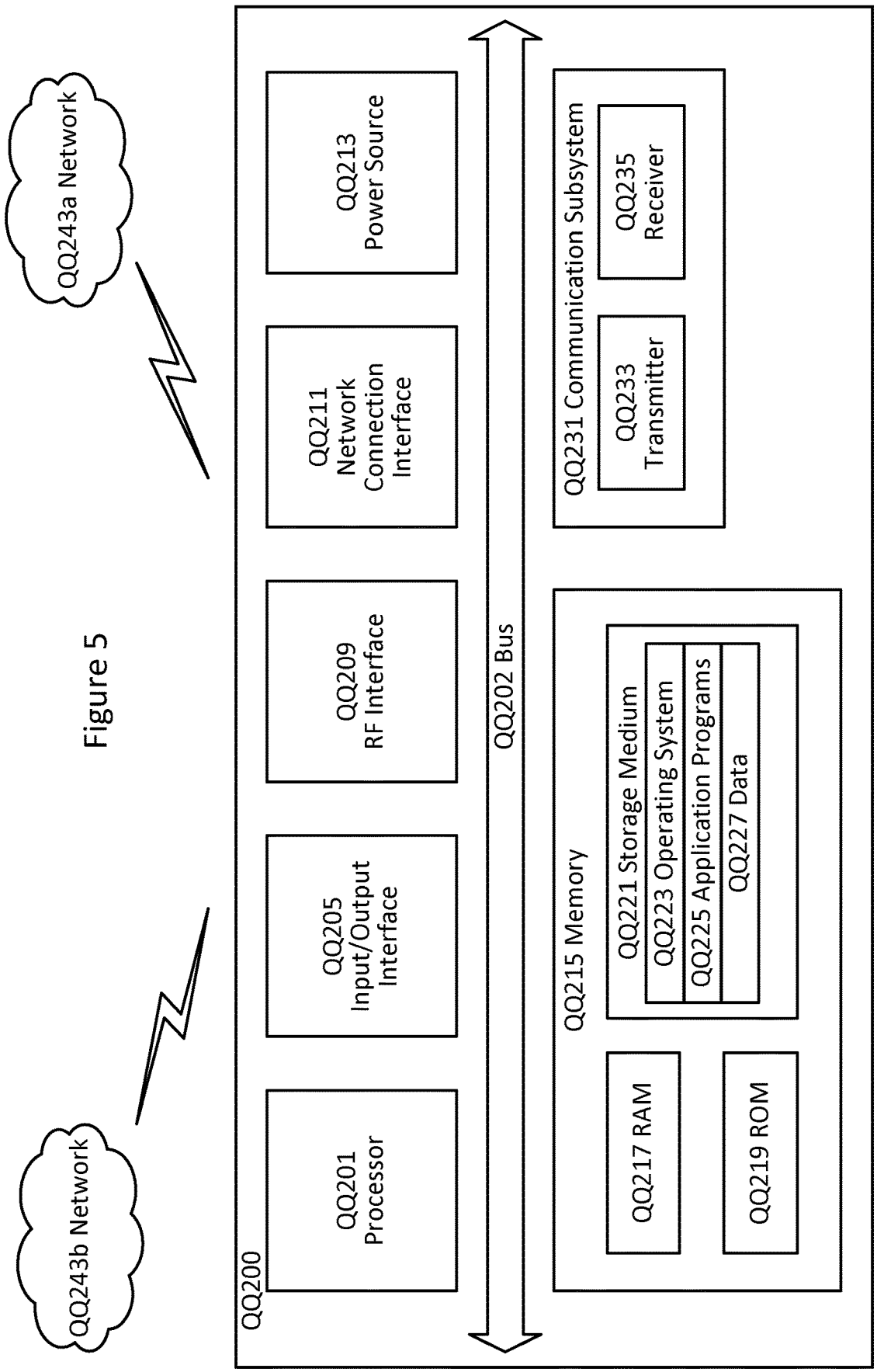
FIG. 5 is a block diagram of a user equipment in accordance with some embodiments

FIG. 5: User Equipment in accordance with some embodiments

FIG. 5 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 5, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 5 is a UE, the components discussed herein are equally applicable to a WD, and vice-versa.

In FIG. 5, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 5, or only a subset of the components. The level of integration between the components may vary from one UE to another UE. Further, certain UEs may contain multiple instances of a component, such as multiple processors, memories, transceivers, transmitters, receivers, etc.

In FIG. 5, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 5, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 6:
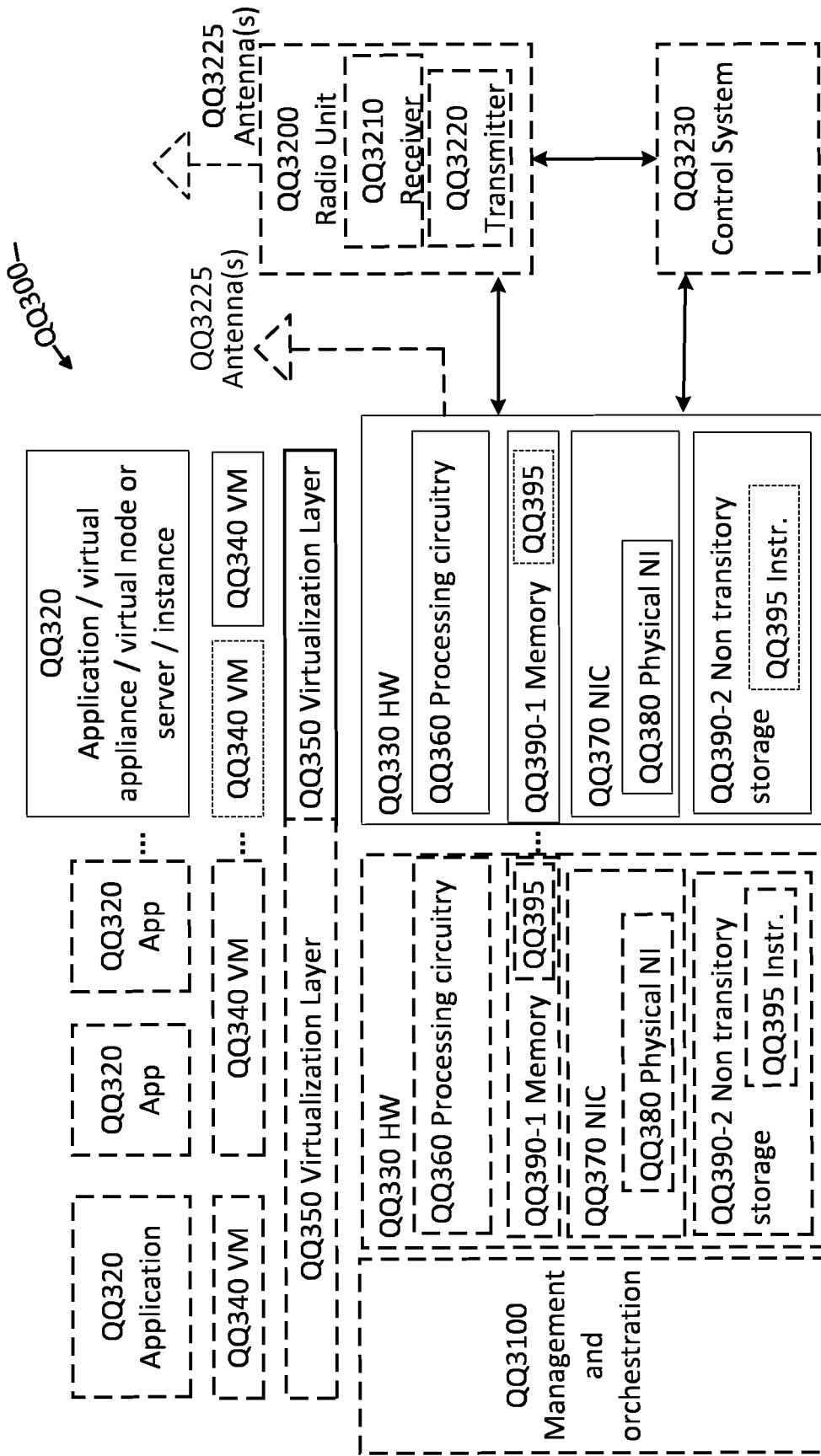
FIG. 6 is a block diagram of a virtualization environment in accordance with some embodiments.

FIG. 6: Virtualization environment in accordance with some embodiments

FIG. 6 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 6, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 6.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 7:
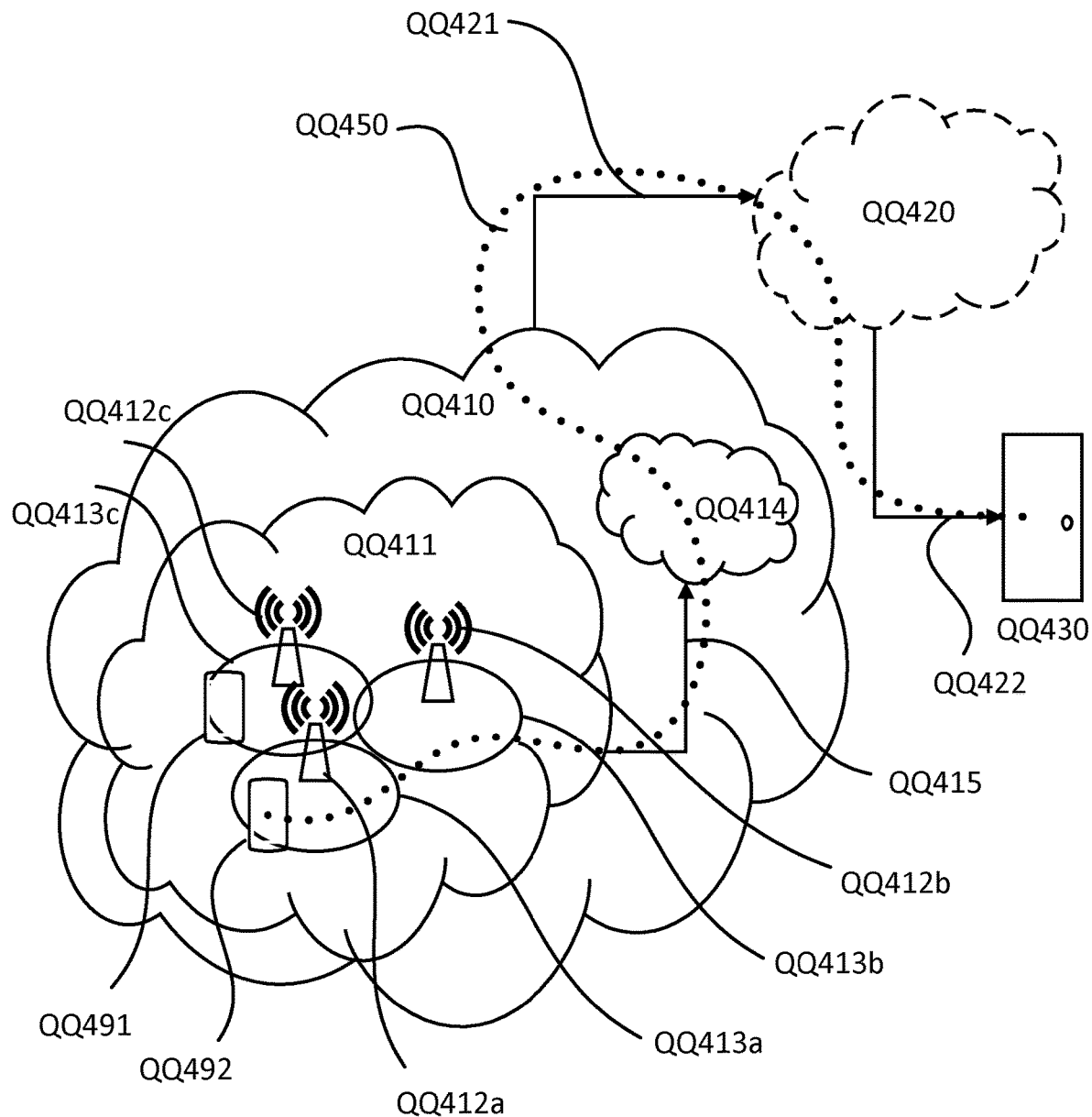
FIG. 7 is a block diagram of a telecommunication network connected via an intermediate network to a host computer in accordance with some embodiments.

FIG. 7: Telecommunication network connected via an intermediate network to a host computer in accordance with some embodiments.

With reference to FIG. 7 in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 7 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 8:
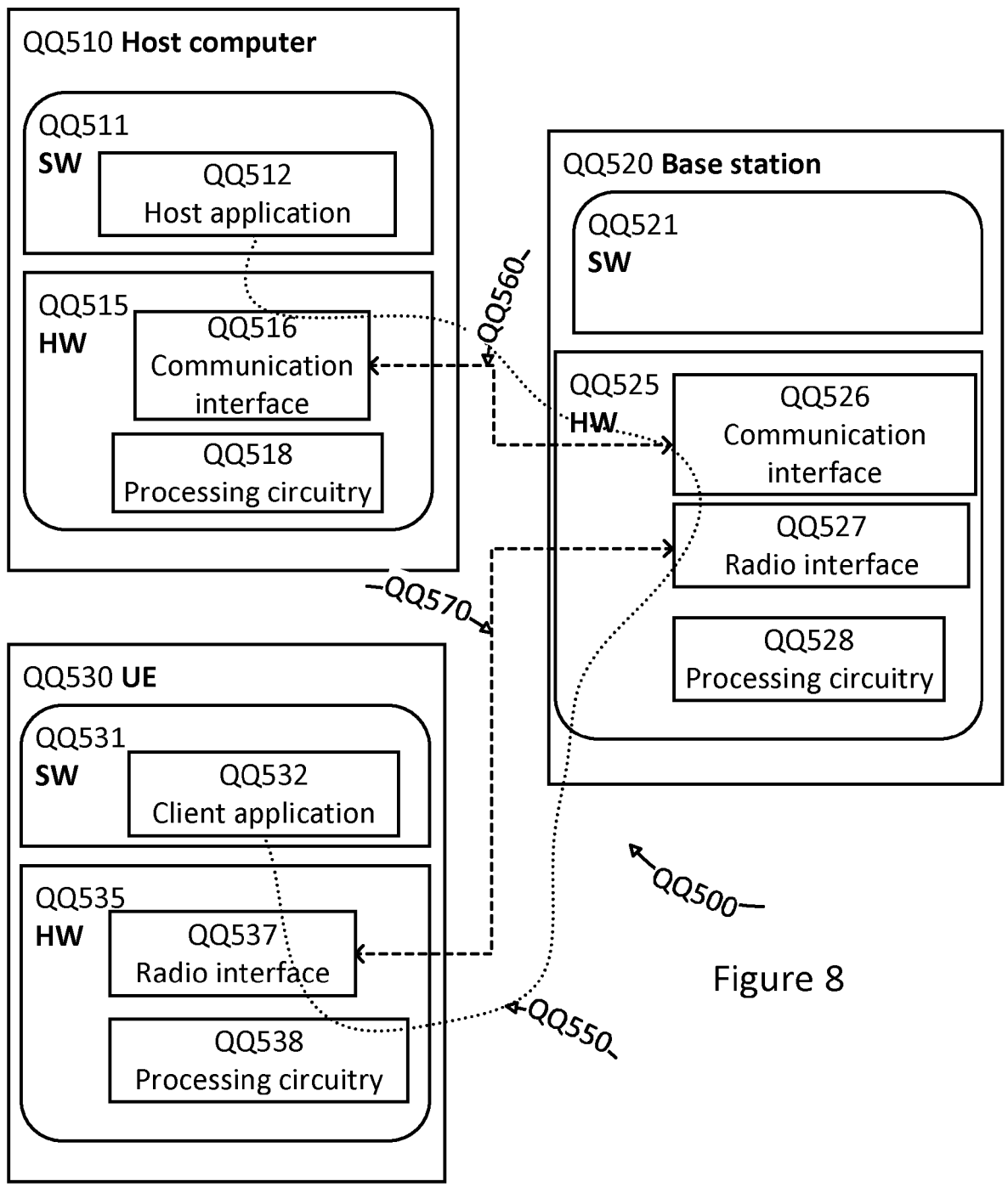
FIG. 8 is a block diagram of a host computer communicating via a base station with a user equipment over a partially wireless connection in accordance with some embodiments.

FIG. 8: Host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 8. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 8) served by base station QQ520. Communication interface QQ526 may be configured to facilitate connection QQ560 to host computer QQ510. Connection QQ560 may be direct or it may pass through a core network (not shown in FIG. 8) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 8 may be similar or identical to host computer QQ430, one of base stations QQ412a, QQ412b, QQ412c and one of UEs QQ491, QQ492 of FIG. 7, respectively. This is to say, the inner workings of these entities may be as shown in FIG. 8 and independently, the surrounding network topology may be that of FIG. 7.

In FIG. 8, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 9:
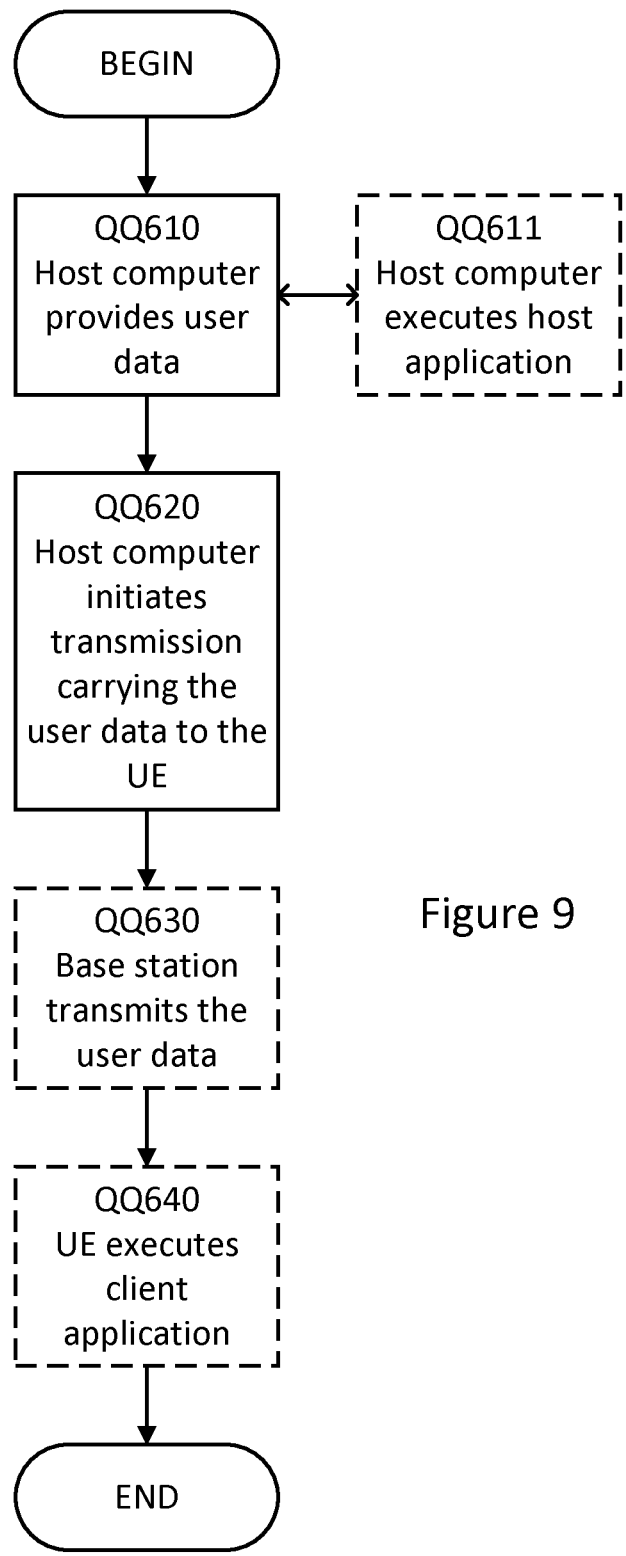
FIG. 9 is a block diagram of methods implemented in a communication system including a host computer, a base station and a user equipment in accordance with some embodiments.

FIG. 9: Methods implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 10:
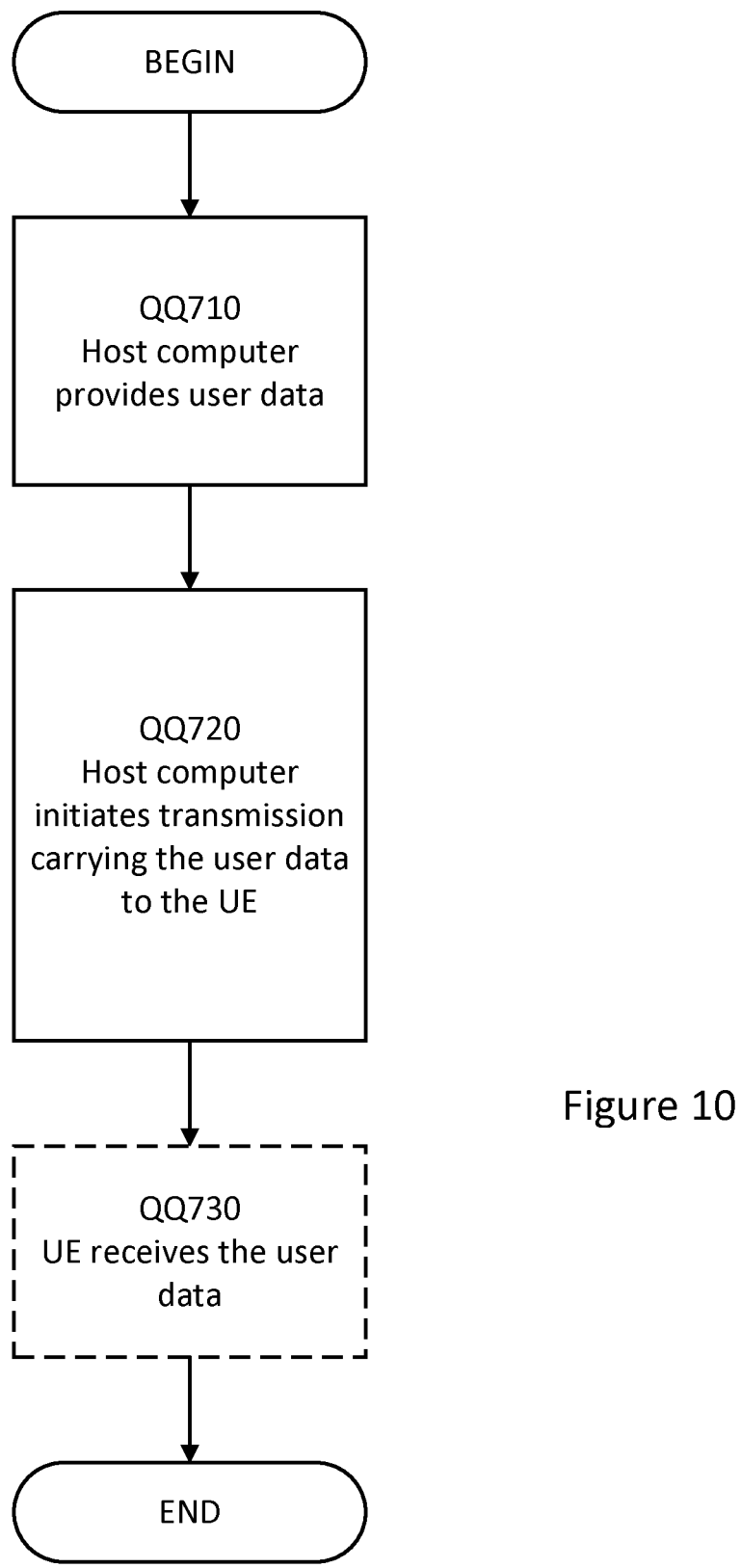
FIG. 10 is a block diagram of methods implemented in a communication system including a host computer, a base station and a user equipment in accordance with some embodiments.

FIG. 10: Methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 11:
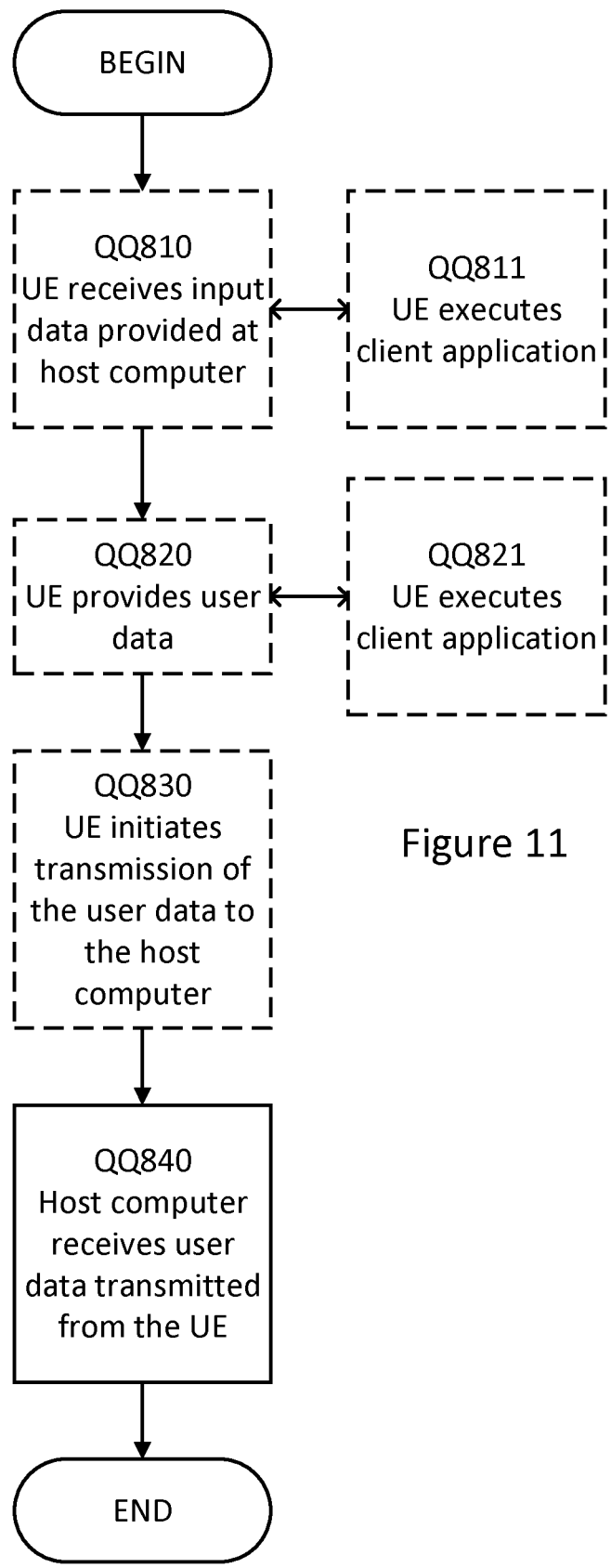
FIG. 11 is a block diagram of methods implemented in a communication system including a host computer, a base station and a user equipment in accordance with some embodiments.

FIG. 11: Methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 12:
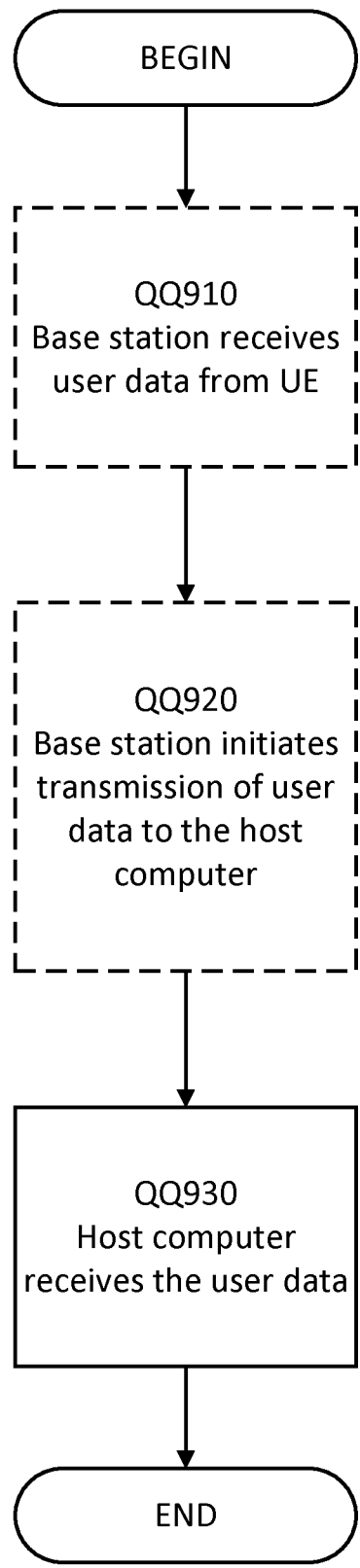
FIG. 12 is a block diagram of methods implemented in a communication system including a host computer, a base station and a user equipment in accordance with some embodiments.

FIG. 12: Methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein. Explanations for abbreviations from the above disclosure are provided below.

| Abbreviation | Explanation |
|---|---|
| AUSF | Authentication Server Function |
| DDoS | Distributed Denial of Service |
| IMSI | International Mobile Subscriber Identity |
| MCC | Mobile Country Code |
| MNC | Mobile Network Code |
| MSIN | Mobile Subscriber Identification Number |
| NAI | Network Access Identifier |
| TMSI | Temporary Mobile Subscriber Identity |
| UDM | Unified Data Management |

Citations for References are provided below.
Reference [1] RFC 5448, J. Arkko et al., Improved Extensible Authentication Protocol Method for 3rd Generation Authentication and Key Agreement (EAP-AKA'), IETF, May 2009.
Reference [2] J. Arkko et al., Improved Extensible Authentication Protocol Method for 3rd Generation Authentication and Key Agreement (EAP-AKA'), draft-ietf-emu-rfc5448bis-04.txt, Jan. 17, 2019.
Reference [3] J. Arkko et al., Perfect-Forward Secrecy for the Extensible Authentication Protocol Method for Authentication and Key Agreement (EAP-AKA' PFS), draft-arkko-eap-aka-pfs-04.txt, Jan. 21, 2019.
Reference [4] 3GPP TS 23.501 V15.4.0 (2018 December), System Architecture for the 5G System; Stage 2 (Release 15).
Reference [5] 3GPP TS 33.501 V15.3.1 (2018 December), Security architecture and procedures for 5G system (Release 15).
Reference [6] 3GPP TS 23.003 V15.6.0 (2018 December), Numbering, addressing and identification (Release 15).
Reference [7] RFC 3748, B. Aboba et al., Extensible Authentication Protocol (EAP), June 2004.

The invention claimed is:

1. A method of operating a network node of a mobile communication network, the method comprising:
   receiving an authentication process start message from each of a plurality of user equipment (UE), the authentication process start message being received from each UE including an identifier for the UE;
   responsive to receiving the authentication process start message from each of the plurality of UEs, transmitting a request commit message to each of the plurality of UEs; and
   when a response to a request commit message to the UE is not received, stopping authentication of the UE from which the response to the request commit message is not received.

2. The method of claim 1, wherein the request commit message comprises a liveness check request, wherein the response commit message comprises a liveness check response, and wherein the method further includes determining to proceed with authentication of the UE based on receiving the liveness check response.

3. The method of claim 1, wherein the request commit message comprises a request to solve a cryptographic puzzle, wherein the response commit message comprise a solution to the cryptographic puzzle, and wherein the method further includes determining whether to proceed with authentication of the UE based on the solution to the cryptographic puzzle.

4. The method of claim 3, further comprising determining to not proceed with authentication of the UE responsive to the solution to the cryptographic puzzle being incorrect, the method further comprising:
   stopping authentication of the UE responsive to determining to not proceed.

5. The method of claim 3, further comprising determining to proceed with authentication of the UE responsive to the solution to the cryptographic puzzle being correct.

6. The method of claim 1, wherein the request commit message comprises a request to provide a token, wherein the response commit message comprises an authentication priority token, and wherein the method further includes determining whether to proceed with authentication of the UE based on the authentication priority token.

7. The method of claim 6, further comprising determining to not proceed with authentication of the UE responsive to the authentication priority token being incorrect, the method further comprising:
   stopping authentication of the UE responsive to determining to not proceed.

8. The method of claim 6, further comprising determining to proceed with authentication of the UE responsive to the authentication priority token being correct.

9. The method of claim 1, wherein the request commit message comprises a request to either provide a token or solve a cryptographic puzzle, wherein the response commit message comprises one of an authentication priority token or a solution to the cryptographic puzzle, and wherein the method further includes determining whether to proceed with authentication of the UE based on the response commit message comprising the one of the authentication priority token or the solution to the cryptographic puzzle.

10. The method of claim 9, further comprising determining to not proceed with authentication of the UE responsive to the response commit message including one of an incorrect authentication priority token or an incorrect solution to the cryptographic puzzle, the method further comprising:
stopping authentication of the UE responsive to determining to not proceed.

11. The method of claim 9, further comprising determining to proceed with authentication of the UE responsive to the response commit message including one of a correct authentication priority token or a correct solution to the cryptographic puzzle.

12. The method of claim 2, further comprising:
responsive to determining to proceed, transmitting an authentication challenge message to the UE.

13. The method of claim 12 further comprising:
responsive to determining to proceed, decrypting the identifier for the UE from the authentication process start message; and
wherein transmitting the authentication challenge message is transmitted based on decrypting the identifier.

14. The method of claim 1, wherein the request commit message comprises a liveness check request.

15. A network node of a mobile communication network, the network node comprising:
a processor; and
memory coupled with the processor, wherein the memory includes instructions that when executed by the processor causes the node to:
receive an authentication process start message from each of a plurality of user equipment (UE), the authentication process start message received from each UE including an identifier for the UE;
responsive to receiving the authentication process start message from each of the plurality of UEs, transmit a request commit message to each of the plurality of UEs; and
when a response to a request commit message to the UE is not received, stop authentication of the UE from which the response to the request commit message is not received.

16. The network node according to claim 15, wherein the request commit message comprises a liveness check request, wherein the response commit message comprises a liveness check response, and wherein determining comprises determining to proceed with authentication of the UE based on receiving the liveness check response.

\* \* \* \* \*